US012395788B2

(12) United States Patent
Lee et al.

(10) Patent No.: US 12,395,788 B2
(45) Date of Patent: Aug. 19, 2025

(54) APPARATUS AND METHOD FOR RENDERING AN AUDIO SCENE USING VALID INTERMEDIATE DIFFRACTION PATHS

(71) Applicant: Fraunhofer-Gesellschaft zur Foerderung der angewandten Forschung e.V., Munich (DE)

(72) Inventors: Sangmoon Lee, Erlangen (DE); Frank Wefers, Erlangen (DE)

(73) Assignee: Fraunhofer-Gesellschaft Zur Foerderung der angewandten Forschung e.V., Munich (DE)

( * ) Notice: Subject to any disclaimer, the term of this patent is extended or adjusted under 35 U.S.C. 154(b) by 376 days.

(21) Appl. No.: 17/930,665

(22) Filed: Sep. 8, 2022

(65) Prior Publication Data

US 2023/0019204 A1 Jan. 19, 2023

Related U.S. Application Data

(63) Continuation of application No. PCT/EP2021/056365, filed on Mar. 12, 2021.

(30) Foreign Application Priority Data

Mar. 13, 2020 (EP) .................................... 20163155

(51) Int. Cl.
*H04R 1/34* (2006.01)
*H04S 7/00* (2006.01)

(52) U.S. Cl.
CPC ............... *H04R 1/34* (2013.01); *H04S 7/303* (2013.01)

(58) Field of Classification Search
CPC ................................. H04R 1/34; H04S 7/303
See application file for complete search history.

(56) References Cited

U.S. PATENT DOCUMENTS 8,437,868 B2 5/2013 Spille et al.
8,488,796 B2 7/2013 Jot et al.
(Continued)

FOREIGN PATENT DOCUMENTS

CN 101673549 A 3/2010
CN 104604257 A 5/2015
(Continued)

OTHER PUBLICATIONS

Dirk Schröder, Physically Based Real-Time Auralization of Interactive Virtual Environments http://publications.rwth-aachen.de/record/50580/files/3875.pdf—(2011) 231 pages.
(Continued)

*Primary Examiner* — Duc Nguyen
*Assistant Examiner* — Assad Mohammed
(74) *Attorney, Agent, or Firm* — Perkins Coie LLP; Michael A. Glenn

(57) ABSTRACT

An apparatus for rendering an audio scene comprising an audio source at an audio source position and a plurality of diffracting objects, comprises: a diffraction path provider for providing a plurality of intermediate diffraction paths through the plurality of diffracting objects, an intermediate diffraction path having a starting point and an output edge of the plurality of diffracting objects and an associated filter information for the intermediate diffraction path; a renderer for rendering the audio source at a listener position, wherein the renderer is configured for determining, based on the output edges of the intermediate diffraction paths and the listener position, one or more valid intermediate diffraction paths from the audio source position to the listener position, determining, for each valid intermediate diffraction path of the one or more valid intermediate diffraction paths, a filter representation for a full diffraction path, and calculating audio output signals for the audio scene using an audio
(Continued)

signal associated to the audio source and the filter representation for each full diffraction path.

18 Claims, 13 Drawing Sheets

(56) References Cited

U.S. PATENT DOCUMENTS

| | | | | |
|---|---|---|---|---|
| 9,564,138 | B2 | 2/2017 | Oh et al. | |
| 9,711,126 | B2 | 7/2017 | Mehra et al. | |
| 9,940,922 | B1 | 4/2018 | Schissler et al. | |
| 10,075,800 | B2 | 9/2018 | Sladeczek et al. | |
| 10,206,055 | B1 * | 2/2019 | Mindlin | H04S 5/005 |
| 2006/0029243 | A1 | 2/2006 | Gerrard et al. | |
| 2012/0249556 | A1 * | 10/2012 | Chandak | G10K 15/02 345/473 |
| 2013/0259115 | A1 | 10/2013 | Stieglitz | |
| 2014/0139738 | A1 | 5/2014 | Mehta et al. | |
| 2014/0161268 | A1 | 6/2014 | Antani et al. | |
| 2015/0365777 | A1 | 12/2015 | Kim | |
| 2015/0378019 | A1 | 12/2015 | Schissler et al. | |
| 2016/0034248 | A1 | 2/2016 | Schissler et al. | |
| 2017/0208417 | A1 | 7/2017 | Thakur et al. | |
| 2017/0324792 | A1 | 11/2017 | Estrop et al. | |
| 2017/0325045 | A1 | 11/2017 | Baek et al. | |
| 2018/0098172 | A1 | 4/2018 | Family et al. | |
| 2018/0295460 | A1 | 10/2018 | Chon et al. | |
| 2018/0359591 | A1 | 12/2018 | Bygrave | |
| 2019/0013031 | A1 | 1/2019 | Disch et al. | |
| 2019/0020968 | A1 | 1/2019 | Suenaga et al. | |
| 2019/0349701 | A1 | 11/2019 | Mehta et al. | |
| 2019/0356999 | A1 * | 11/2019 | Raghuvanshi | H04S 7/304 |
| 2020/0142665 | A1 * | 5/2020 | Dantrey | H04L 67/52 |
| 2020/0142851 | A1 | 5/2020 | Catiller | |
| 2023/0007426 | A1 | 1/2023 | Koppens | |
| 2023/0007427 | A1 | 1/2023 | Mate et al. | |

FOREIGN PATENT DOCUMENTS

| | | | |
|---|---|---|---|
| CN | 108419174 | A | 8/2018 |
| EP | 3090573 | A1 | 11/2016 |
| EP | 3220669 | B1 | 12/2018 |
| EP | 3470976 | A1 | 4/2019 |
| JP | 2003061200 | A | 2/2003 |
| JP | 2017530413 | A | 10/2017 |
| JP | 2019506695 | A | 3/2019 |
| KR | 20170125660 | A | 11/2017 |
| RU | 2523215 | C2 | 7/2014 |
| RU | 2540774 | C2 | 2/2015 |
| RU | 2602346 | C2 | 11/2016 |
| RU | 2646375 | C2 | 3/2018 |
| RU | 2656986 | C1 | 6/2018 |
| RU | 2698775 | C1 | 8/2019 |
| WO | 2010017967 | A1 | 2/2010 |
| WO | 2014036085 | A1 | 3/2014 |
| WO | 2015102920 | A1 | 7/2015 |
| WO | 2015156654 | A1 | 10/2015 |
| WO | 2016054186 | A1 | 4/2016 |
| WO | 2017140949 | A1 | 8/2017 |

OTHER PUBLICATIONS

Borish, J., "Extension of the image model to arbitrary polyhedra", The Journal of the Acoustical Society of America 75.6 (1984): 1827-1836, pp. 1827-1836.

Kouyoumjian, et al., "A uniform geometrical theory of diffraction for an edge in a perfectly conducting surface", Proc. of the IEEE, (19740000), vol. 62, No. 11, pp. 1448-1461, XP000605077, 1974, pp. 1448-1461.

Mechel, F. P, "Improved mirror source method in room acoustics", Journal of sound and vibration 256.5 (2002): 873-940, 2002, pp. 873-940.

Savioja, Lauri, et al., "Interpolated rectangular 3-D digital waveguide mesh algorithms with frequency warping", IEEE Trans. Speech Audio Process., (20030000), vol. 11, No. 6,doi:10.1109/TSA.2003.818028, pp. 783-790, XP011104550, pp. 783-790.

Stephenson, U. M, "Analytical derivation of a formula for the reduction of computation time by the voxel crossing technique used in room acoustical simulation", Applied Acoustics 67.10 (2006): 959-981, 2006, pp. 959-981.

Vorländer, Michael, "Simulation of the transient and steady-state sound propagation in rooms using a new combined raytracing/image-source algorithm", The Journal of the Acoustical Society of America, (19890000), vol. 86, No. 1, pp. 172-178, pp. 172-178.

Potard, "Decorrelation Techniques for the Rendering of Apparent Sound Source Width in 3D Audio Displays", Proc. of the 7th Int'l Conference on Digital Audio Effects (DAFx'04), Naples, Italy, Oct. 5-8, 2004, pp. 280-284.

Schissler, Carl, et al., "Efficient HRTF-based Spatial Audio for Area and Volumetric Sources", IEEE Transactions on Visualization and Computer Graphics, vol. 22, No. 4, 2016 r., pp. 1356-1366.

Allen, John B, et al., "Image method for efficiently simulating small-room acoustics", The Journal of the Acoustical Society of America, (19790000), vol. 65, No. 4 pp. 943-950, 1979, pp. 943-950.

Funkhouser, Thomas, et al., "A beam tracing approach to acoustic modeling for interactive virtual environments", Proc. of ACM SIGGRAPH, (19980000), doi:10.1145/280814.280818, pp. 21-32, XP058331794, pp. 21-32.

Krokstad, A, et al., "Calculating the acoustical room response by the use of a ray tracing technique", Journal of Sound and Vibration 8.1 (1968): 118-125, pp. 118-125.

Mehra, Ravish, et al., "Source and listener directivity for interactive wave-based sound propagation", IEEE Transactions on Visualization and Computer Graphics, (20140000), vol. 20, No. 4, doi:10.1109/TVCG.2014.38, pp. 495-503, XP011543571, pp. 495-503.

Mehra, Ravish, et al., "Wave-based sound propagation in large open scenes using an equivalent source formulation", ACM Trans. on Graphics, (20130000), vol. 32, No. 2,pp. 1-13, pp. 1-13.

Noe, Nicolas, et al., "[Uploaded in 2 parts] Application de l'acoustique géométrique à la simulation de la réflexion et de la diffraction par des surfaces courbes", 10ÈME Congrès Françaisd'acoustique, (20100416), pp. 1-7, XP055810825 [A] 1-19 * the whole document, 4 pp.

Noe, Nicolas, et al., "A general ray-tracing solution to reflection on curved surfaces and diffraction by their bounding edges", Theoretical and Computationalacoustics 2009, (Sep. 11, 2009), pp. 225-234, XP055810798 [A] 1-19 * sections 2("Previous work"), 3.3 ("Tesselated geometry"), 3.4 ("Acoustic computations"); figures1 (b), 6, pp. 225-234.

Pharr, Matt, et al., "[Uploaded in 9 parts] Physically Based Rendering", Morgan Kaufmann Publishers Inc. San Francisco, USA, 51 pp.

Raghuvanshi, Nikunj, et al., "Parametric directional coding for precomputed sound propagation", ACM Trans. on Graphics, (20180000), vol. 37, No. 4, pp. 1-14, pp. 1-14.

Savioja, Svensson, et al., "Overview of geometrical room acoustic modelling techniques", The Journal of the Acoustical Society of America 138.2 (2015): 708-730, pp. 708-730.

Schissler, Car, et al., "High-order diffraction and diffuse reflections for interactive sound propagation in large environments", ACM Transactions on Graphics, ACM, NY,US, (Jul. 27, 2014), vol. 33, No. 4, doi:10.1145/2601097.2601216, ISSN 0730-0301, pp. 1-2, XP058516463 [A] 1-20, pp. 1-12.

Schröoeder, "Physically Based Real-Time Auralization of Interactive Virtual Environments", XP055593422, Berlin, Retrieved from the Internet: URL:http://publications.rwth-aachen.de/record/50580/files/3875.pdf [retrieved on Jun. 3, 2019] chapter 5.2.3, Feb. 4, 2011, pp. 1-4.7, 8,19, 20.

Svensson, U. Peter, et al., "An analytic secondary source model of edge diffraction impulse responses", Acoustical Society of America Journal, (19990000), vol. 106, doi:10.1121/1.428071, pp. 2331-2344, XP012001263, 1999, pp. 2331-2344.

(56) References Cited

OTHER PUBLICATIONS

Taylor, Micah, et al., "Guided multiview ray tracing for fast auralization", IEEE Transactions on Visualization and Computer Graphics, (20120000), vol. 18, pp. 1797-1810, pp. 1797-1810.
Taylor, Micah T, et al., "Resound: interactive sound rendering for dynamic virtual environments", Proc. of the seventeen ACM international conference on Multimedia, (20090000), pp. 271-280, 2009, pp. 271-280.
Tsingos, Nicolas, et al., "Modeling acoustics in virtual environments using the uniform theory of diffraction", Proc. of the SIGGRAPH, (20010000), doi:10.1145/383259.383323, pp. 545-552, XP058253479, pp. 545-552.
Tsingos, Nicolas, et al., "Perceptual audio rendering of complex virtual environments", ACM Transactions on Graphics (TOG) 23.3 (2004): 249-258, pp. 249-258.
Ucdavis, "Head-Related Transfer Functions", www.ece.ucdavis.educipic-spatia-sound_Head-Related, 2019, 6 pp.
Vorländer, Michael, "[Uploaded in 3 parts] Auralization: fundamentals of acoustics, modelling, simulation, algorithms and acoustic virtual reality", Springer Science & Business Media, 2007, 170 pp.
Wenzel, Elizabeth M, et al., "Sound Lab: A real-time, software-based system for the study of spatial hearing", Audio Engineering Society Convention 108. Audio Engineering Society, 2000, 2000, 27 pp.
Yeh, Hengchin, et al., "Wave-ray coupling for interactive sound propagation in large complex scenes", ACM Trans. Graph., (20130000), vol. 32, No. 6, doi:10.1145/2508363.2508420, pp. 1-11, XP058033914, pp. 1-11.

* cited by examiner

| | | | |
|---|---|---|---|
| without DO : | EDGE 1 | | EDGE 5 |
| | MAAS | | MAAL |
| with DO : | EDGE 1 | EDGE 7 | EDGE 5 |
| | $MAAS_1$ | $\varphi_{1-20-5}$ | $MAAL_1$ |
| | EDGE 1 | EDGE 3 | EDGE 5 |
| | $MAAS_2$ | $\varphi_{1-30-5}$ | $MAAL_2$ |

Fig. 2b

| | starting edge | path 400 | (Fig. 4) | final edge |
|---|---|---|---|---|
| path by edges | edge no. 1 | edge no. 7 | edge no. 11 | edge no. 12 |
| path by triangles | 1-R | 7-B | 11-R | 12-B |
| path by angles | MAAS | $\varphi_{1\text{-}7\text{-}11}$ | $\varphi_{7\text{-}11\text{-}12}$ | MAAL |
| | | path 300 | (Fig. 3) | |
| path by edges | edge no. 1 | edge no. 7 | edge no. 11 | edge no. 13 |
| path by triangles | 1-R | 7-B | 11-R | 13-B |
| path by angles | MAAS | $\varphi_{1\text{-}7\text{-}11}$ | $\varphi_{7\text{-}11\text{-}13}$ | MAAL |

⋮

Fig. 8

APPARATUS AND METHOD FOR RENDERING AN AUDIO SCENE USING VALID INTERMEDIATE DIFFRACTION PATHS

CROSS-REFERENCES TO RELATED APPLICATIONS

This application is a continuation of copending International Application No. PCT/EP2021/056365, filed Mar. 12, 2021, which is incorporated herein by reference in its entirety, and additionally claims priority from European Application No. EP 20 163 155.3, filed Mar. 13, 2020, which is incorporated herein by reference in its entirety.

BACKGROUND OF THE INVENTION

The present invention relates to audio signal processing and, particularly, relates to audio signal processing in the context of geometrical acoustics as can be used, for example, in virtual reality or augmented reality applications.

The term virtual acoustics is often applied when a sound signal is processed to contain features of a simulated acoustical space and sound is spatially reproduced either with binaural or with multichannel techniques. Therefore, virtual acoustics consist of spatial sound reproduction and room acoustics modeling [1].

In terms of room modeling technologies, the most accurate ways for propagation modeling are solving the theoretical wave equation subject to a set of boundary conditions. However, most of the approaches based on numerical solvers are limited to precompute the relevant acoustic features such as parametric models to approximate impulse responses because of computational complexity: it becomes a real huddle when the frequency of interests and/or the size of scene space (volume/surface) increase and even a dynamically moving object exists. Given the fact that recent virtual scenes are getting larger and more sophisticated to enable very detailed and sensitive interaction between a player and an object or between players within a scene, current numerical approaches are not adequate to handle interactive, dynamic and large scaled virtual scenes. A few algorithms have shown their rendering abilities by precomputing relevant acoustic features by using parametric directional coding for precomputed sound propagation [2, 3] and an efficient GPU-based time domain solver for the acoustic wave equation [4]. However, these approaches demand high-quality system resources such as a graphic card, multi-core computing system.

The geometric acoustics (GA) technique is a practically reliable approach for interactive sound propagation environments. The commonly used GA techniques include the image source method (ISM) and the ray tracing method (RTM) [5, 6] and modified approaches using beam tracing and frustum tracing were developed for interactive environments [7, 8]. For diffraction sound modeling, Kouryoumjian [9] proposed the uniform theory of diffraction (UTD) and Svensson [10] proposed the Biot-Tolstoy-Medwin (BTM) model for better approximation of diffracted sound in the numerical sense. However, current interactive algorithms were limited to static scenes [11] or first-order diffraction in dynamic scenes [12].

Hybrid approaches are possible by combining these two categories: numerical methods for lower frequencies and GA methods for higher frequencies [13].

Particularly in complex sound scenes with several diffracting objects, the processing requirements for modeling sound diffraction around edges become high. Hence very powerful computational resources are required to adequately model the diffraction effects of sound in audio scenes with a plurality of diffracting objects.

SUMMARY

According to an embodiment, an apparatus for rendering an audio scene having an audio source at an audio source position and a plurality of diffracting objects may have: a diffraction path provider for providing a plurality of intermediate diffraction paths through the plurality of diffracting objects, an intermediate diffraction path having a starting point and an output edge of the plurality of diffracting objects and an associated filter information for the intermediate diffraction path; a renderer for rendering the audio source at a listener position, wherein the renderer is configured for determining, based on the output edges of the intermediate diffraction paths and the listener position, one or more valid intermediate diffraction paths from the audio source position to the listener position, determining, for each valid intermediate diffraction path of the one or more valid intermediate diffraction paths, a filter representation for a full diffraction path from the audio source position to the listener position corresponding to a valid intermediate diffraction path of the one or more valid intermediate diffraction paths using a combination of the associated filter information for the valid intermediate diffraction path and a filter information describing an audio signal propagation from the output edge of the valid intermediate diffraction path to the listener position, and calculating audio output signals for the audio scene using an audio signal associated to the audio source and the filter representation for each full diffraction path.

According to another embodiment, a method for rendering an audio scene having an audio source at an audio source position and a plurality of diffracting objects may have the steps of: providing a plurality of intermediate diffraction paths through the plurality of diffracting objects, an intermediate diffraction path having a starting point and an output edge of the plurality of diffracting objects and an associated filter information for the intermediate diffraction path; rendering the audio source at a listener position, wherein the rendering includes determining, based on the output edges of the intermediate diffraction paths and the listener position, one or more valid intermediate diffraction paths from the audio source position to the listener position, determining, for each valid intermediate diffraction path of the one or more valid intermediate diffraction paths, a filter representation for a full diffraction path from the audio source position to the listener position corresponding to a valid intermediate diffraction path of the one or more valid intermediate diffraction paths using a combination of the associated filter information for the valid intermediate diffraction path and a filter information describing an audio signal propagation from the output edge of the valid intermediate diffraction path to the listener position, and calculating audio output signals for the audio scene using an audio signal associated to the audio source and the filter representation for each full diffraction path.

Another embodiment may have a non-transitory digital storage medium having a computer program stored thereon to perform the method for rendering an audio scene having an audio source at an audio source position and a plurality of diffracting objects, the method having the steps of: providing a plurality of intermediate diffraction paths through the plurality of diffracting objects, an intermediate diffraction path having a starting point and an output edge of the plurality of diffracting objects and an associated filter information for the intermediate diffraction path; rendering the audio source at a listener position, wherein the rendering includes determining, based on the output edges of the intermediate diffraction paths and the listener position, one or more valid intermediate diffraction paths from the audio source position to the listener position, determining, for each valid intermediate diffraction path of the one or more valid intermediate diffraction paths, a filter representation for a full diffraction path from the audio source position to the listener position corresponding to a valid intermediate diffraction path of the one or more valid intermediate diffraction paths using a combination of the associated filter information for the valid intermediate diffraction path and a filter information describing an audio signal propagation from the output edge of the valid intermediate diffraction path to the listener position, and calculating audio output signals for the audio scene using an audio signal associated to the audio source and the filter representation for each full diffraction path, when said computer program is run by a computer.

The present invention is based on the finding that the processing of sound diffraction can be significantly enhanced by using intermediate diffraction paths between a starting or input edge and a final or output edge of a sound scene that already have associated filter information. This associated filter information already covers the whole path between the starting edge and the final edge irrespective of whether there are a single or several diffractions between the starting edge and the final edge. The procedure relies on the fact that the way between the starting edge and the final edge, i.e., the route the sound waves have to go due to the diffraction effect does not depend on the typically variable listener position and also does not depend on the audio source position. Even when an audio source has a variable position as well, only the variable source position or the variable listener position changes from time to time, but any intermediate diffraction path between a starting edge and a final edge of diffracting objects does not depend on anything but the geometry. This diffraction path is constant, since it is only defined by diffracting objects provided by the audio scene geometry. Such paths only are variable over time, when one of the plurality of diffracting objects changes its shape and which implies that such paths won't change for a movable rigid geometry. In addition, the plurality of objects in an audio scene are static, i.e., are not movable. Providing a complete filter information for a whole intermediate diffraction path increases the processing efficiency, particularly in runtime. Even though the filter information for an intermediate diffraction path that is finally not used since it has not been positively validated, has to be calculated as well, this calculation can be performed in an initialization/encoding step and does not have to be performed in runtime. In other words, any runtime processing with respect to filter information or with respect to intermediate diffraction paths only has to be done for the typically rarely occurring dynamic objects, but for the normally occurring static objects, the filter information associated with a certain intermediate diffraction path stays the same irrespective of any moving audio source of any moving listener.

An apparatus for rendering an audio scene comprising an audio source at an audio source position and a plurality of diffracting objects comprises a diffraction path provider for providing a plurality of intermediate diffraction paths through the plurality of diffracting objects, where an intermediate diffraction path has a starting point or starting edge and an output edge or final edge of the plurality of diffracting objects and the associated filter information for the intermediate diffraction path describing the whole sound propagation due to diffraction from the starting point or starting edge until the output edge or the output or final point. Typically, the plurality of intermediate diffraction paths are provided by a preprocessor in an initialization step or in a pre-calculation step occurring before an actual runtime processing in, for example, a virtual reality environment. The diffraction path provider does not have to calculate all this information in runtime, but can, for example, provide this information as a list of intermediate diffraction paths, on which the renderer can access during runtime processing.

The renderer is configured for rendering the audio source at a listener position, where the renderer is configured for determining, based on the output edges of the intermediate diffraction paths and the listener position, one or more valid intermediate diffraction paths from the audio source position to the listener position. The renderer is configured for determining, for each valid intermediate diffraction path of the one or more valid intermediate diffraction paths, a filter representation for a full diffraction path from the audio source position to the listener position corresponding to a valid intermediate diffraction path of the one or more valid intermediate diffraction paths using a combination of the associated filter information for the valid intermediate diffraction path and a filter information describing an audio signal propagation from the output edge of the valid intermediate diffraction path or from the final edge to the listener position. The audio output signals for the audio scene can be calculated using an audio signal associated to the audio source and the complete filter representation for each full diffraction path.

Depending on the application, the audio source position is fixed and then the diffraction path provider determines each valid intermediate diffraction path so that the starting point of each valid intermediate diffraction path corresponds to the fixed audio source position. Alternatively, when the audio source position is variable, then the diffraction path provider determines, as the starting point of an intermediate diffraction path, an input or starting edge of the plurality of diffracting objects. The renderer is configured to determine, additionally based on the input edge of the one or more intermediate diffraction paths and the audio source position of the audio source the one or more valid intermediate diffraction paths, i.e., to determine the paths that can belong to the specific audio source position in order to determine the final filter representation for the full diffraction path additionally based on the further filter information from the source to the input edge so that, in this case, the complete filter representation is determined by three pieces. The first piece is the filter information for the sound propagation from the sound source position to the input edge. The second piece is the associated information belonging to the valid intermediate diffraction path, and the third piece is the sound propagation from the output or final edge to the actual listener position.

The present invention is advantageous, since it provides an efficient method and system from simulating diffracted sounds in complex virtual reality scenes. The present invention is advantageous, since it allows the modeling of sound propagation via a static and dynamic geometrical object. Particularly, the present invention is advantageous in that it provides the method and system on how to calculate and store diffraction path information based on a set of a priori known geometrical primitives. Particularly, the diffraction sound path includes a set of attributes such as a group of geometrical primitives for potential diffraction edges, diffraction angles and in-between diffraction edges, etc.

The present invention is advantageous, since it allows the analysis of geometrical information of given primitives and the extraction of a useful database via the preprocessor in order to enhance the speed of rendering sounds in real-time. Particular, the procedures as, for example, disclosed in US application 2015/0378019 A1 or other procedures as described later on enable to precompute the visibility graph between edges whose structure minimizes the number of diffraction edges that need to be considered at runtime. The visibility between two edges does not necessarily mean that the exact path from a source to a listener is specified, since, in a precomputation stage, a source and the listener's locations are typically not known. Instead the visibility graph between all the possible pairs of edges is a map to navigate from a set of visible edges from a source to a set of visible edges from a listener.

BRIEF DESCRIPTION OF THE DRAWINGS

Embodiments of the present invention will be detailed subsequently referring to the appended drawings, in which:

FIG. 2*b* is a list for describing the diffraction paths without and with the dynamic object (DO);

FIG. 8 illustrates an exemplary path list with two intermediate diffraction paths illustrated in FIG. 4 and FIG. 3;

DETAILED DESCRIPTION OF THE INVENTION

Figure 7:
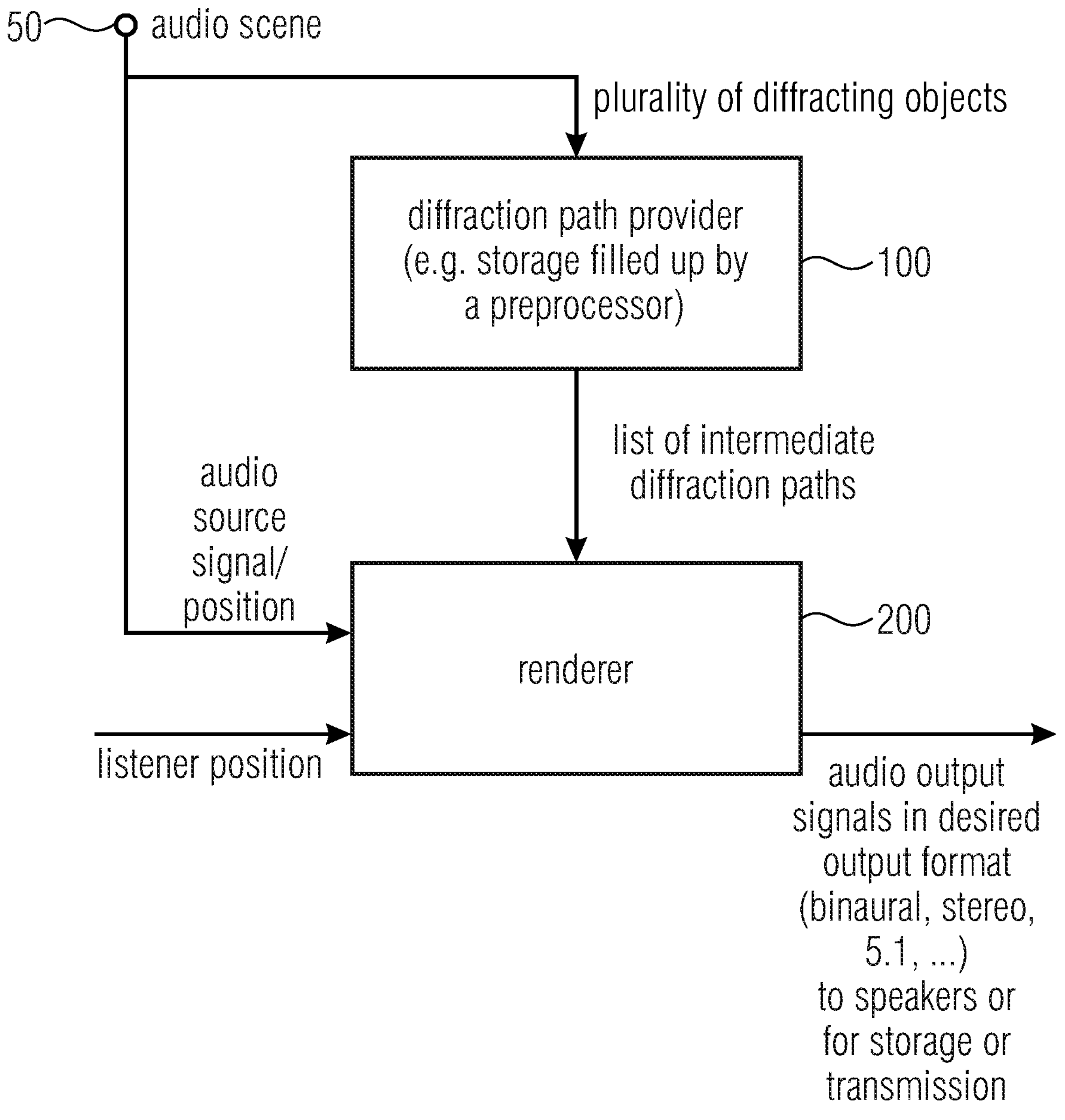
FIG. 7 illustrates an apparatus for rendering a sound scene in accordance with an embodiment.

FIG. 7 illustrates an apparatus for rendering an audio scene comprising an audio source with an audio source signal at an audio source position and a plurality of diffracting objects. A diffraction path provider 100 comprises, for example, a storage filled up by a preprocessor having performed the calculation of the intermediate diffraction paths at a initialization step, i.e., before the runtime processing operation performed by a renderer 200. Depending on the information of a list of intermediate diffraction paths obtained by the diffraction path provider 100, the renderer is configured to calculate audio output signals in a desired output format such an a binaural format, a stereo format, a 5.1 format, or any other output format to speakers of a headphone or to loudspeakers or just for storage or transmission. To this end, the renderer 200 not only receives the list of intermediate diffraction paths, but also receives a listener position and an audio source signal on the one hand and the audio source position on the other hand.

Particularly, the renderer 200 is configured to render the audio source at a listener position, so that the sound signal is calculated that arrives at the listener position. This sound signal exists due to the audio source being placed at the audio source position. To this end, the render is configured for determining, based on the output edges of the intermediate diffraction paths and the actual listener position, the one or more valid intermediate diffraction paths from the audio source position to the listener position. The renderer is also configured for determining, for each valid intermediate diffraction path of the one or more valid intermediate diffraction paths, a filter representation for a full diffraction path from the audio source position to the listener position corresponding to a valid intermediate diffraction path of the one or more valid intermediate diffraction paths using a combination of the associated filter information for the valid intermediate diffraction path and a filter information describing an audio signal propagation from the output edge of the valid intermediate diffraction path to the listener position.

The renderer calculates the audio output signals for the audio scene using an audio signal associated to the audio source and using the filter representation for each full diffraction path. Dependent on the implementation, the renderer can also be configured to additionally calculate first order, second order or higher-order reflections in addition to the diffraction calculation and, additionally, the renderer can also be configured to calculate, if existing in the sound scene, the contribution from one or more additional audio sources and also the contribution of a direct sound propagation from a source that has a direct sound propagation path that is not occluded by diffracting objects.

Subsequently, embodiments of the present invention are described in more detail. Particularly, any first order diffraction paths can, if necessary, be actually calculated in real-time, but this is even highly problematic in case of complex scenes with several diffracting objects.

Particularly for higher-order diffraction paths, the calculation of such diffraction paths in real-time is problematic due to a significant amount of redundant information in visibility maps as the ones illustrated in US 2015/0378019 A1. For instance, in the scene like the one in FIG. 1, when a source locates in the right side of the first edge and a listener is in the left side of the fifth edge, one can imagine that the diffracted sound goes from a source to a listener via the first and fifth edges. However, the way to build up the diffraction path edge by edge in real-time based on the visibility graph becomes computationally complex especially when the average number of visible edges increases and the order of diffraction gets higher. In addition, runtime edge-to-edge visibility checks are not performed, which limits diffraction effects between dynamic objects and between one static and one dynamic object. It is only possible to care for a diffraction effect for a static object or a single dynamic object. The only way to combine diffraction effects by dynamic object(s) with the effect associated with static objects is to update all the visibility graphs with relocated primitives of dynamic objects. However, this is hardly possible in runtime.

Figure 3:
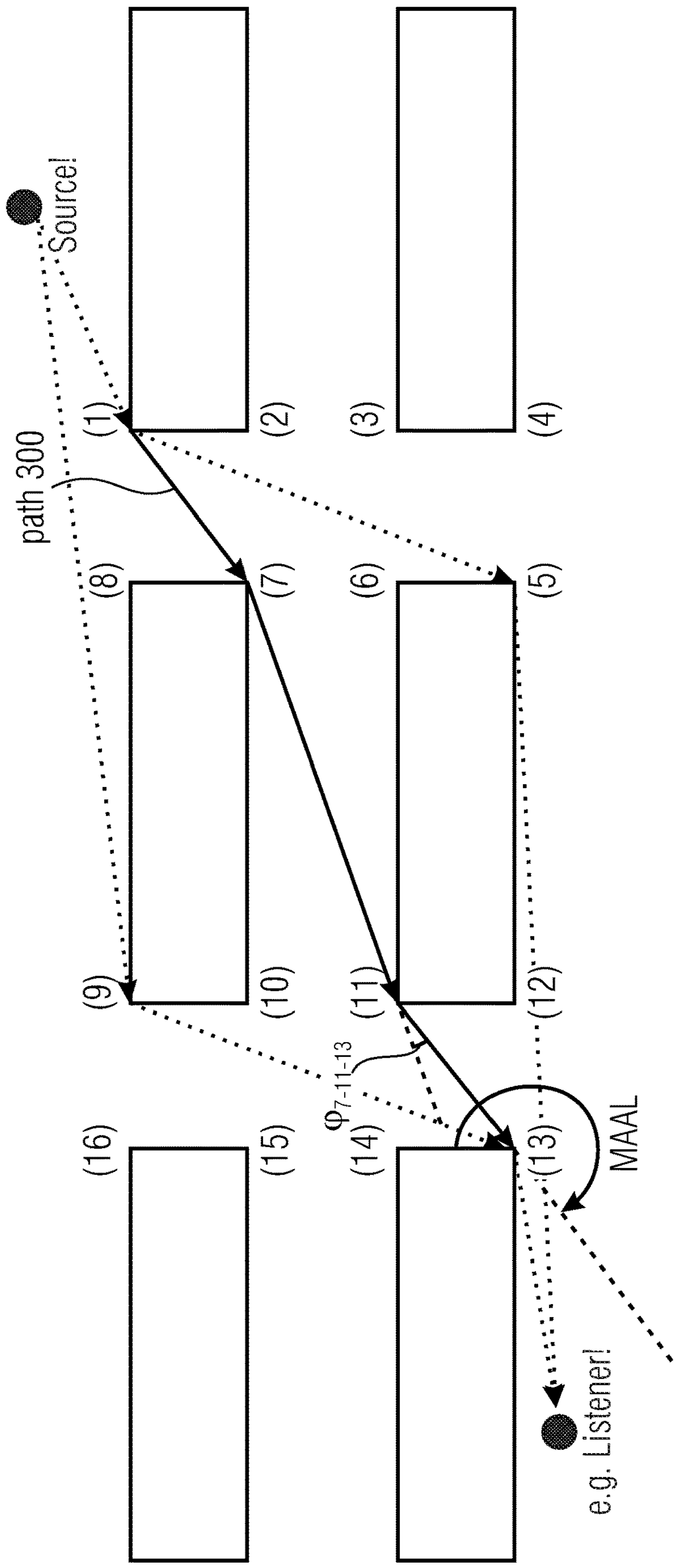
FIG. 3 is a top view of an example scene with six static objects.

The inventive method aims to reduce required runtime computations to specify the possible (first/higher-order) diffraction paths through edges of static and dynamic objects from a source to a listener. As a result, a set of multiple diffracted sounds/audio streams is rendered with proper delays. Embodiments of the concepts are applied using the UTD model to multiple visible and properly oriented edges with a newly designed system hierarchy. As a result, embodiments can render higher-order diffraction effects by a static geometry, by a dynamic object, by a combination of a static geometry and a dynamic object, or by a combination of multiple dynamic objects as well. More detail information about the concept will be presented in the following subsection The main idea that initiated this embodiment started from the question; "do we need to keep calculating the intermediate diffraction paths?" For instance, as shown in FIG. 3, from a source to a listener, we might be able to say that there are three possible diffraction paths; (source)-(1)-(5)-(listener), (source)-(9)-(13)-(listener), and (source)-(1)-(7)-(11)-(listener). For the simplicity to explain, the last path via three intermediate edges including (1), (7) and (11) is a good example. In the interactive environment, a source can move and a listener can move as well. However, in any situations, the intermediate paths including (1)-(7), (7)-(11), and (11)-(13) do not change unless there is a dynamic object occluding these intermediate paths. (Note that how to handle/combine the diffraction effects by dynamic objects will be presented at the end of this section) Therefore, once one can precompute intermediate paths from the first order to an allowed higher-order by edges, adjacent polygons (e.g., triangle mesh) and diffraction angles within intermediate paths, then it will minimize the required computations in runtime.

Figure 4:
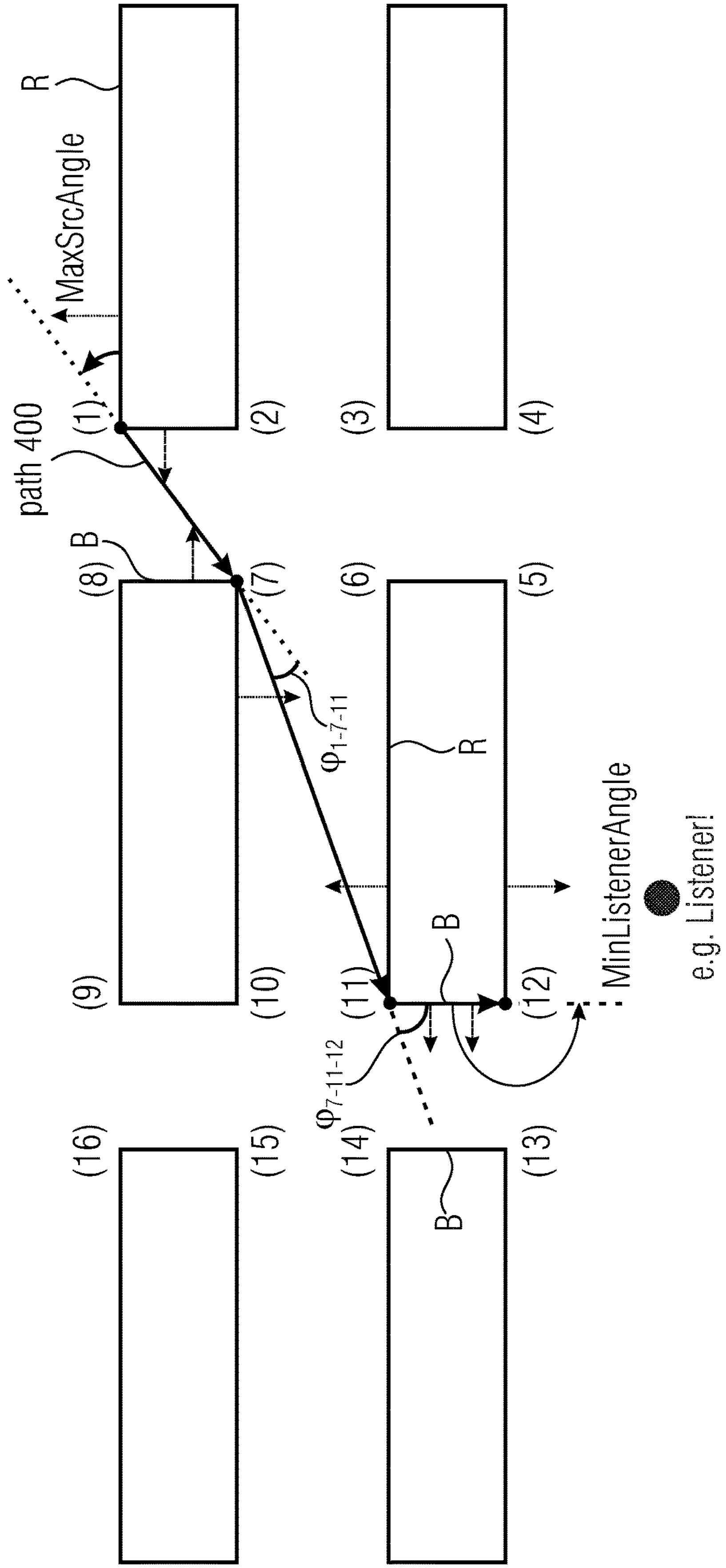
FIG. 4 is a top view of an example scene with six static objects to illustrate how to calculate a higher-order diffraction path from the first or input edge.

For instance, FIG. 4 shows an example scene with six static objects to illuminate how to calculate a higher-order diffraction path from an edge. In this case, it starts from the first edge and an edge could contain several correlated information as below:

```
struct DiffractionEdge {
    const EAR::Geomtery* parentGeometry;
    int meshID;
    int edgeID;
    std::pair < EAR::Vector3, EAR::Vector3 > vtxCoords;
    std::pair < EAR::Mesh::Triangle*, EAR::Mesh::Triangle* > adjTris;
    float internalAngle;
    std::vector < DiffractionEdge* > visibleEdgeList;
};
```

For instance, the parentGeometry or meshID indicates the geometry which the selected edge belongs to. In addition, an edge can be physically defined as the line of two vertices (by their coordinates or vertex ids) and adjacent triangles would be helpful to calculate angles from an edge, a source, or a listener. The internalAngle is the angle between two adjacent triangles which indicates the maximum possible diffraction angle around this edge. And also this is the indicator which can decide if this edge would be a potential diffraction edge or not.

From the selected edge (in this case, the first edge as shown in FIG. 4), one can imagine two possible diffraction orientations from one of the triangle mesh into the open space and from the other. These orientations are visualized by the normal vectors of adjacent triangles shown as red and blue arrows. For instance, along the red-colored surface normal (in the counter-clock wise direction), edge no. 2, no. 4, no. 5, and no. 7 would be next edges for diffraction by checking if there is a marginal space (i.e., dark zone) for a wave to be diffracted. For instance, a sound wave can not diffract from edge no. 1 to edge no. 6 because at the edge no. 6, both side of the edge no. 6 are visible from the edge no. 1, which means that there does not exist any dark zone by the edge no. 6 with respect to a sound wave coming from the edge no. 1. And as a next step, one can find the next possible diffraction edge from the edge no. 7 as no. 10 and no. 11. For instance, if one navigates to the edge no. 11, then one can calculate the intermediate angle from the edge no. 1, no. 7, to no. 11. This intermediate angle is defined as the angle between inward and outward waves and in this case, the inward wave to the edge no. 7 is a vector from the edge no. 1 to no. 7 and the outward one is from no. 7 to no. 11. And one can express it as $\varphi_{1\text{-}7\text{-}11}$. However, at the beginning or at the end of the path, such an intermediate angle does not exist. Instead, one can assign the maximum allowable angle for a source (MAAS) and the minimum allowable angle for a listener (MAAL). That means if a source angle with respect to the associated surface normal (in this case Red at the edge no. 1) is larger than MAAS, then a source can see the second edge (e.g., no. 7). In the same concept, if a listener has a lower angle than a given MAAL, then a listener can see the edge before the last edge in the path. In real-time, based on the MAAL and MAAS values, one can calculate the angle of a source and a listener with respect to the associated surface normal and then one can validate this path. Therefore, the precomputed fourth-order path 400 in the scene of FIG. 4 can be defined as a vector of edges, triangles, and angles as shown in FIG. 8, upper portion.

Figure 5:
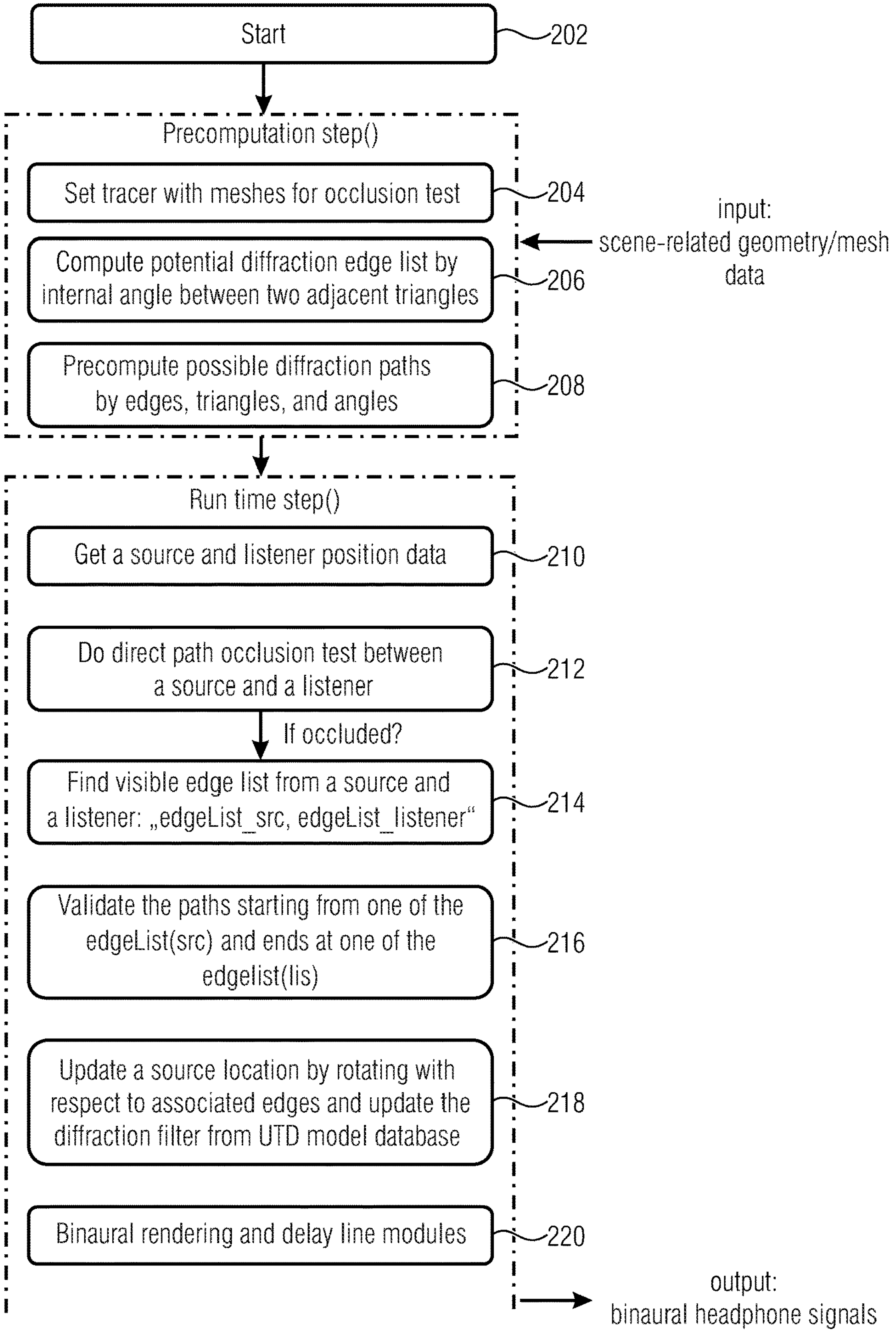
FIG. 5 illustrates a block diagram of an algorithm to precompute the intermediate diffraction paths (including higher-order paths) and to render the diffracted sound in real-time.

The overall procedure of the precomputation of intermediate paths and related real-time rendering algorithms is in FIG. 5. Once one precomputes all possible diffraction paths within a scene, then one only needs to find the visible edge list from a source location as a starting point for diffraction and the list from a listener location as a final point only if the direct path between a source and a listener is occluded. Then, one needs to calculate the angle of a source with respect to the associated triangle (e.g., 1-R in Table 1) and the angle of a listener with respect to the triangle (e.g., 12-B in Table 1). If the source angle is smaller than MAAS and the listener angle is larger than MAAL, then it will be a valid path along which the sound source signal will be propagated. Then one can update the source location and diffraction filters using the edge vertex information and associated angles. The binaural rendering module will synthesize the diffracted source information (rotated and filtered) with proper directional filters such as Head-Related Transfer Functions (HRTFs). It is possible to add more features to the diffraction framework such as directivity or distance effects.

Figure 1:
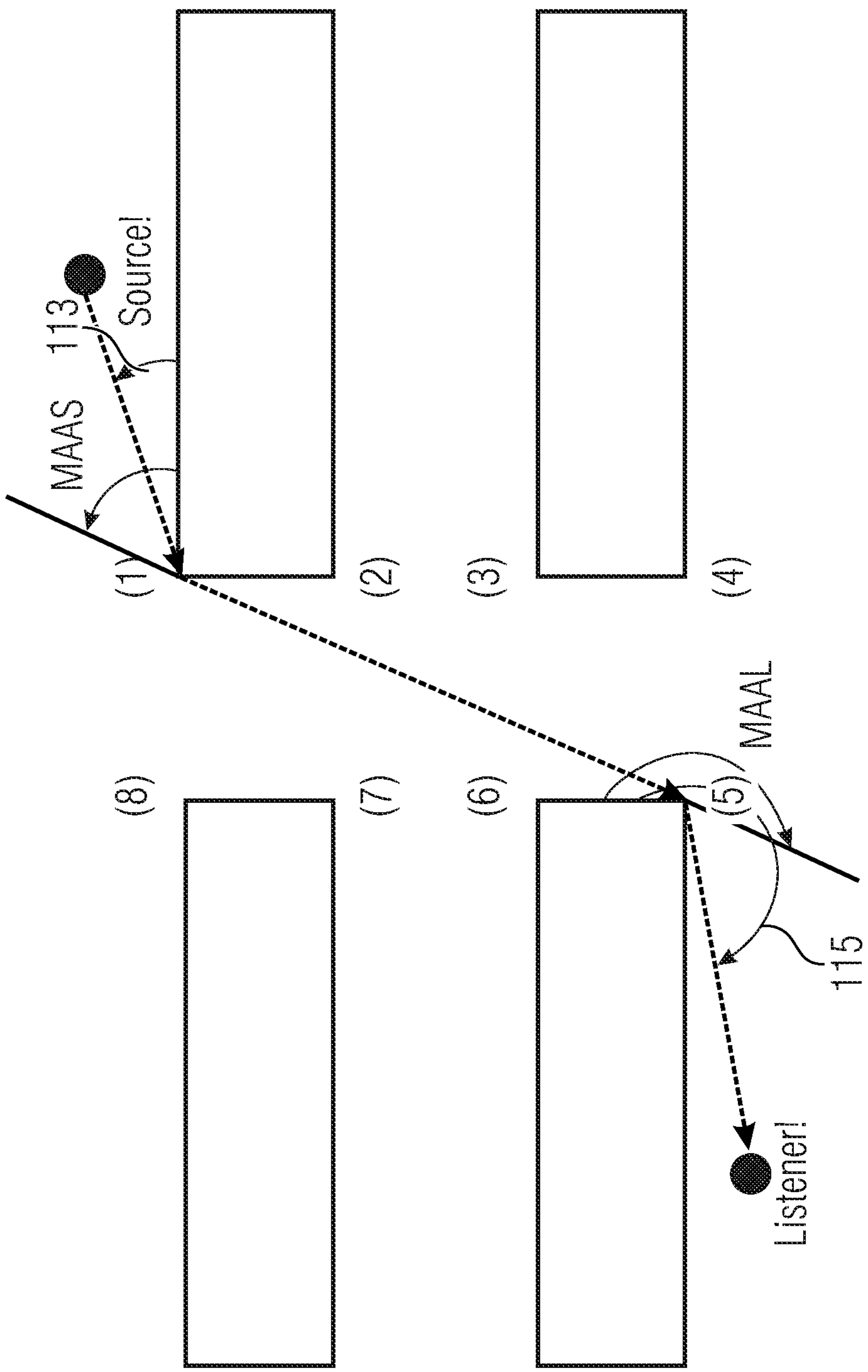
FIG. 1 is a top view of an example scene with four static objects.

FIG. 1 illustrates an audio scene with four diffracting objects where there is a first order diffraction path between edge 1 and edge 5. FIG. 2*b*, upper portion, illustrates the first-order diffraction path from edge 1 to edge 5 with the angle criterion that the source angle with respect to the starting or input edge 1 has to be smaller than the maximum allowable angle for the source. This is the case in FIG. 1. The same is true for the minimum allowable angle for the listener (MAAL). Particularly, the angle of the listener position with respect to the output or final edge calculated from the edge between vertex 5 and vertex 6 in FIG. 1 is greater than the minimum allowable angle for the listener (MAAL). For the current source position in FIG. 1 and the current listener position in FIG. 1, the diffraction path as illustrated in the upper portion of FIG. 2*b* is active and the diffraction characteristic between edge 1 and edge 5 being the associated filter information can be pre-stored in relation to the diffraction path without the dynamic object or can be simply calculated using the edge list of FIG. 2*b*.

FIG. 4 illustrates an intermediate diffraction path 400 going from the input or starting edge to the output or final edge 12. FIG. 3 illustrates another intermediate diffraction path 300 going from starting edge 1 to the final edge 13. The audio scene in FIG. 3 and FIG. 4 has additional diffraction paths from the source to edge 9, then to edge 13 and then to the listener or from the source to edge 1, and from there to edge 5 and from this edge to the listener. However, the path 300 in FIG. 3 is only determined to be a valid intermediate diffraction path for the listener position indicated in FIG. 3 that fulfills the minimum allowable angle for the listener, i.e., the angle criterion MAAL. A listener position illustrated in FIG. 4 would, however, not fulfill this MAAL criterion for path 300.

On the other hand, the listener position in FIG. 3 would not fulfil the MAAL criterion of the path 400 illustrated in FIG. 4. Hence, the diffraction path provider 100 or the preprocessor would forward the plurality of intermediate diffraction paths illustrated in FIG. 8 that comprises the intermediate diffraction path 400 illustrated in FIG. 4 as a first list entry and providing the other intermediate diffraction path 300 illustrated in FIG. 3. This list of intermediate diffraction paths would be provided to the renderer and the renderer determines one or more valid intermediate diffraction paths from the audio source position to the listener position. In case of a listener position illustrated in FIG. 3, only path 300 of the list in FIG. 8 would be determined as a valid intermediate diffraction path, while, for a listener position illustrated in FIG. 4, only the path 400 would be determined to be a valid intermediate diffraction path.

Referring to the scenario in FIG. 3 or FIG. 4, any intermediate diffraction path having final edges or output edges 15, 10, 7 or 2 would not be determined to be a valid intermediate diffraction path, since these edges are not visible from a listener at all. The renderer 200 in FIG. 7 would select, from all intermediate diffraction paths that are theoretically possible through the audio scene in FIG. 4, only those that have a final edge or output edge visible to the listener, i.e., edge 4, 5, 12, 13 in this example. This would correspond to the edgelist(lis).

Similarly, with respect to the source position, any pre-calculated intermediate diffraction paths provided in the list of intermediate diffraction paths coming from the diffraction path provider 100 of FIG. 7 that have, as a starting edge, for example edge 3, 6, 11 or 14 would not be selected at all. Only the diffraction paths that have starting edges 1, 8, 9, 16 would be selected for the specific validation using the MAAS angle criterion. These edges would be in the edgelist (src).

In summary, the determination of the actual valid intermediate diffraction path, from which the filter representation for the sound propagation from the source to the listener is finally determined, is selected in a three-stage procedure. In a first stage, only the pre-stored diffraction paths having starting edges that match with the source position are selected. In a second stage, only such intermediate diffraction paths that have output edges matching with the listener position are selected, and, in a third stage, each of those selected paths is validated using the angle criterion for the source on the one hand and the listener on the other hand.

Only the intermediate diffraction paths surviving all three stages are then used by the renderer to calculate the audio output signals.

Figure 10:
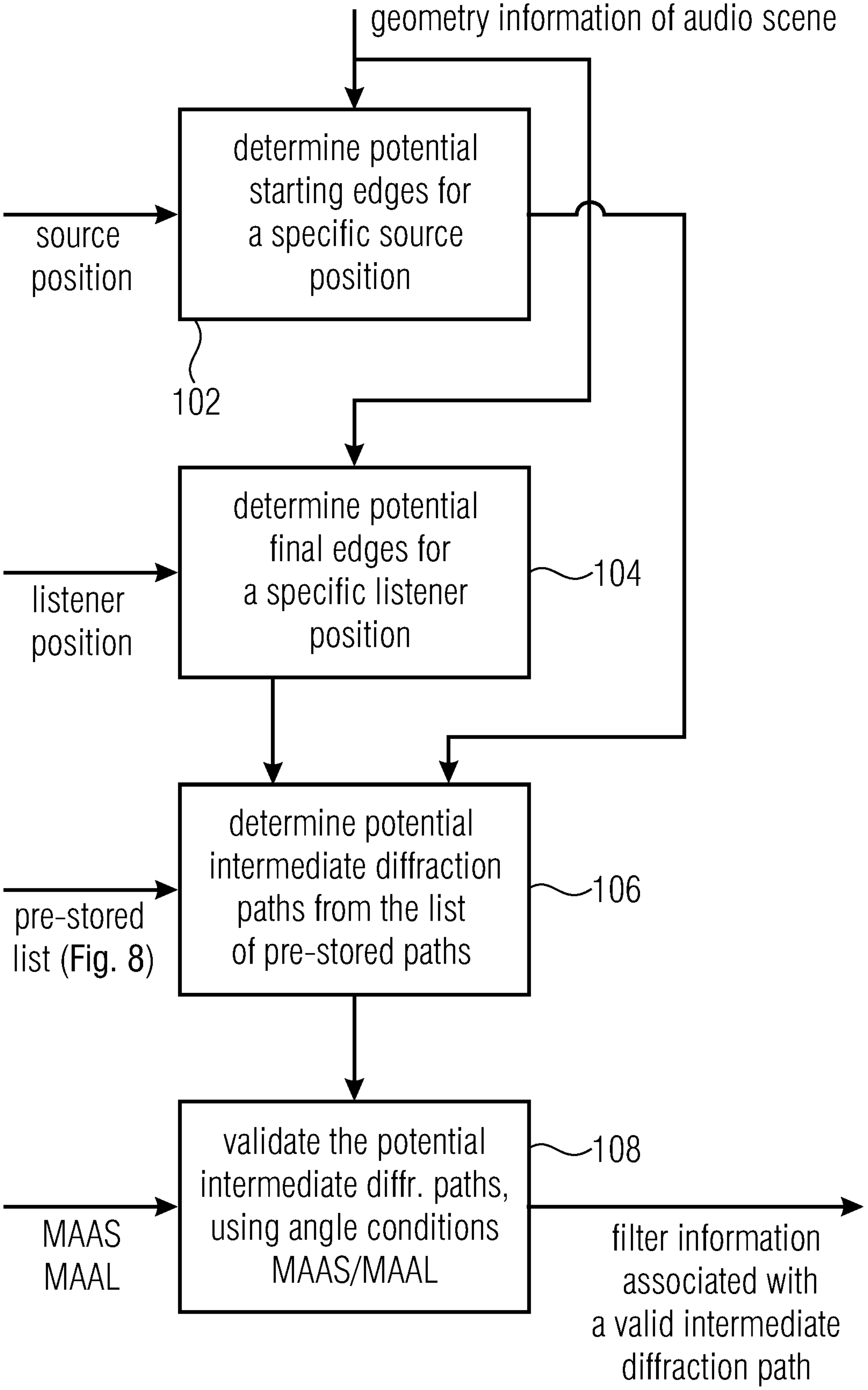
FIG. 10 illustrates an implementation for retrieving the filter information associated with a valid intermediate diffraction path.

FIG. 10 illustrates an implementation of the selection information. In step 102, the potential starting edges for a specific source position are determined using the geometry information of the audio scene, using the source position and, particularly, using the plurality of intermediate diffraction paths already pre-calculated by a preprocessor. In step 104, the potential final edges for a specific listener position are determined. In step 102, the potential intermediate diffraction paths are determined based on the result of step 102 and the result of block 104 which corresponds to the above-described first and second stages. In step 108, the potential intermediate diffraction paths are validated using the angle conditions MAAS or MAAL or, generally, by a visibility determination determining, whether a certain edge is a diffraction edge or not. Step 108 illustrates the above third stage. The input data MAAS and MAALS is obtained from the list of intermediate diffraction paths illustrated, for example, in FIG. 8.

Figure 11:
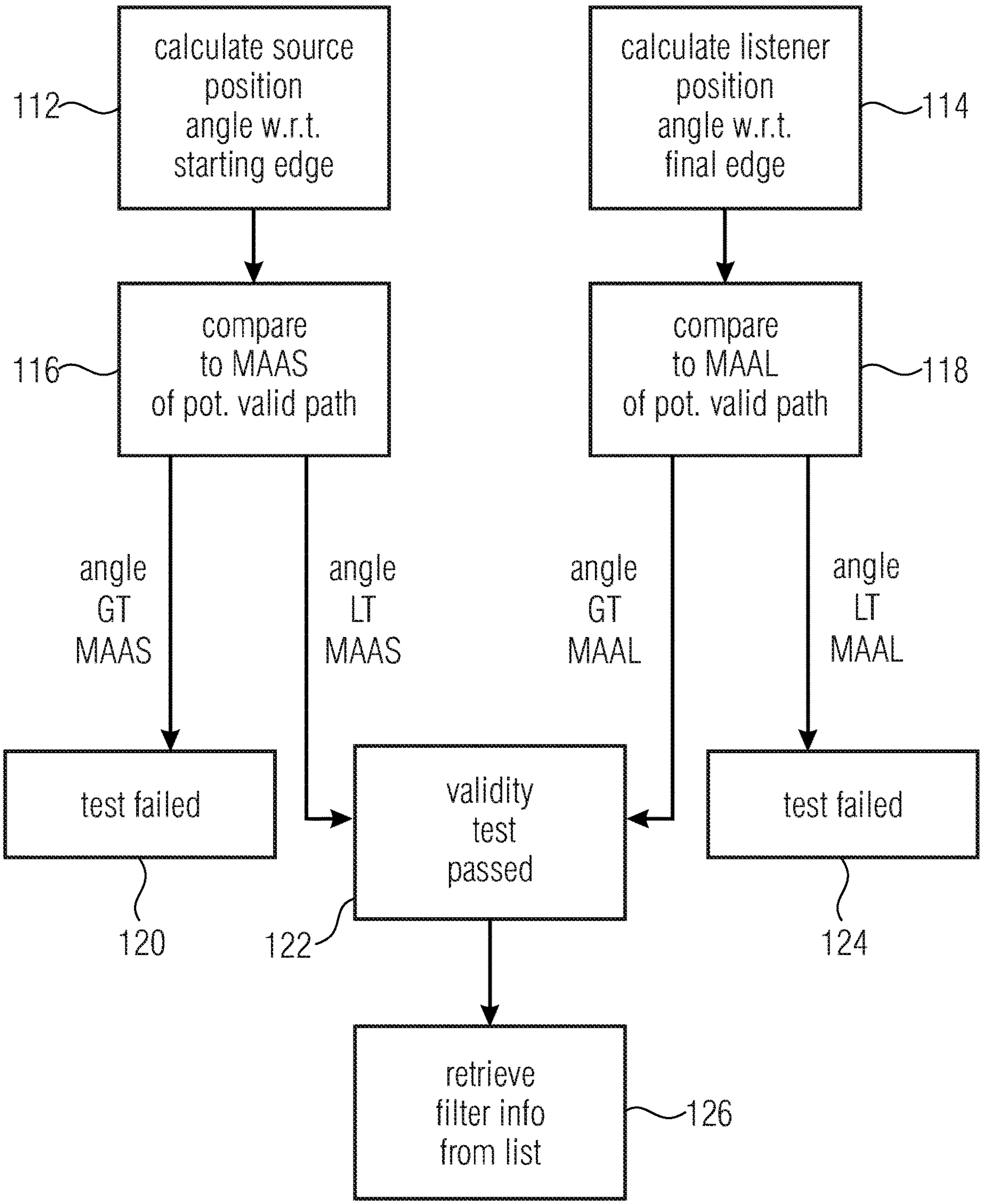
FIG. 11 illustrates the procedure to validate one or more potentially valid intermediate diffraction paths in order to obtain the valid intermediate diffraction paths.

FIG. 11 illustrates a further procedure for the collection of steps performed in block 108 for the validation of the potential intermediate diffraction paths. In step 112, the source position angle is calculated with respect to the starting edge. This corresponds to the calculation of the angle 113 in FIG. 1, for example. In step 114, the listener position angle is calculated with respect to the final edge. This corresponds to the calculation of the angle 115 in FIG. 1. In step 116, the source position angle is compared to the maximum allowable angle for the source MAAS and if it is determined that the comparison results in situations where the angle is greater than MAAS, then the test has failed as indicated in block 120. However, when it is determined that the angle 113 is smaller than MAAS, then the first validity test has been passed.

Nevertheless, the intermediate diffraction path is only a valid intermediate diffraction path, when the second validation is also passed. This is obtained by the result of block 118, i.e., the MAAL is compared to the listener position angle 115. When angle 115 is greater than the MAAL, then the second contribution for the passing of the validity test is obtained as indicated in block 122, and the filter information is retrieved from the intermediate diffraction path list as indicated in step 126, or the filter information is calculated dependent on the data in the list in case of parametric representations depending on, for example, the intermediate angles indicated in the list of FIG. 8, for example.

Figure 9:
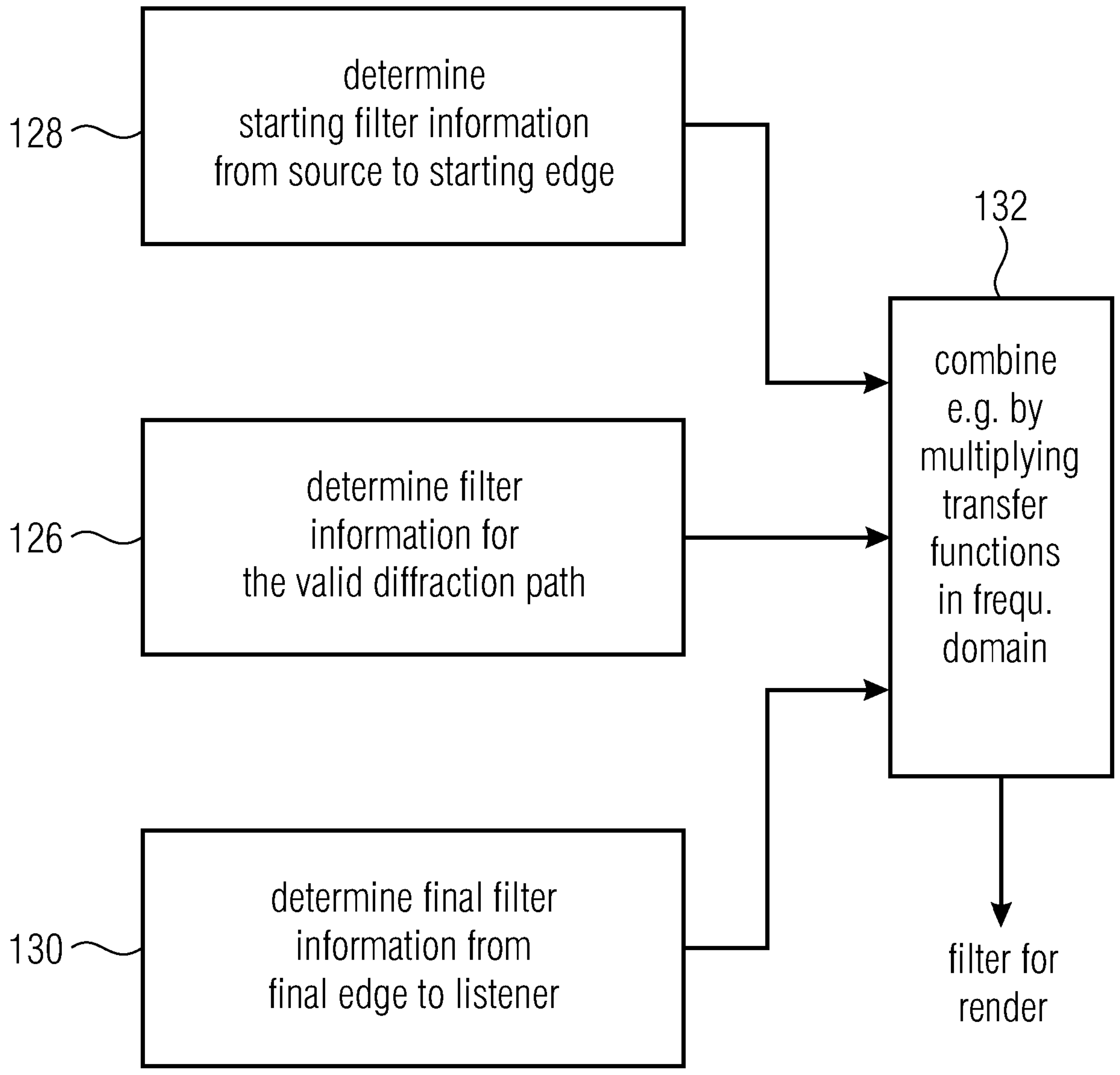
FIG. 9 illustrates a procedure for calculating the filter representation for a full diffraction path.

As soon as the filter information associated with the valid intermediate diffraction path is obtained as is the case subsequent to step 126 in FIG. 11, the audio renderer 200 of FIG. 7 has to calculate the final filter information as is illustrated in FIG. 9. Particularly, step 126 in FIG. 9 corresponds to step 126 of FIG. 11. In step 128, the starting filter information from the source position to the starting edge of the valid intermediate diffraction path is determined. Particularly, this is the filter information describing the audio propagation of the source, for example, in FIG. 1 until the vertex at edge (1). This propagation information not only refers to attenuation due to the distance, but is also depending on the angle. As is known from the geometric theory of diffraction (GTD) or the uniform theory of diffraction (UTD) or any other models for sound diffraction possible for the present invention, the frequency characteristic of diffracted sound depends on the diffraction angle. When the source angle 113 is very small, typically only the low frequency portion of the sound is diffracted and the high frequency portion is stronger attenuated compared to a situation, when the source angle 113 comes closer to the MAAS angle in FIG. 1. In such a situation, the high frequency attenuation is reduced compared to the case, where the source angle is approaching 0 or is very small.

Similarly, the final filter information from the final or output edge 5 to the listener position is again determined based on the listener angle 115 with respect to the MAAL. Then, as soon as those three filter information items or filter contributions are determined, they are combined in step 132 in order to obtain the filter representation for the full diffraction path, where the full diffraction path comprises the path from the source to the starting edge, the intermediate diffraction path and the path from the output or final edge until the listener position. The combination can be done in many ways, and one effective way is to transform each of the three filter representations obtained in step 128, 126 and 130 into a spectral representation to obtain the corresponding transfer function and to then multiple the three transfer functions in the spectral domain in order to obtain the final filter representation that can be used as it is in case of the audio renderer operating in the frequency domain. In an alternative, the frequency domain filter information can be transformed into the time domain in case of the audio renderer operating in the time domain. Alternatively, the three filter items can be subjected to convolution operations using time domain filter impulse responses representing the individual filter contributions and the resulting time domain filter impulse response can then be used by the audio renderer for rendering. In this case, the renderer would perform a convolution operation between the audio source signal on the one hand and the complete filter representation on the other hand.

Subsequently, FIG. 5 is illustrated in order to provide a flow chart for an implementation of the rendering of static differentiating objects. The procedure starts in block 202. Then, a precomputation step is provided in order to generate the list as provided by the diffraction path provider 100 of FIG. 7. In step 204, a tracer is set with meshes for an occlusion test. This step determines all different diffraction paths between edges, where diffraction paths can only occur, by definition, when a direct path between two non-adjacent edges is occluded. When, for example, FIG. 3 is considered, the path between edge 1 and edge 11 is occluded by edge 7 and, therefore, a diffraction can occur. Such situations are, for example, determined by block 204. In block 206, a potential diffraction edge list is calculated using an internal angle between two adjacent triangles. This procedure determines the intermediate or internal angles for such diffraction paths portions, i.e., for example for the portion between edge 1 and edge 11. This step 206 would also determine the further diffraction path portion between edge 7 via edge 11 to edge 12 or between edge 7 via edge 11 to edge 13. The corresponding diffraction paths are precomputed as, for example, illustrated in FIG. 8 so that path 300 of FIG. 3 for example or path 400 of FIG. 4 for example is precomputed together with the associated filter information describing the whole sound propagation from edge 1 to edge 13 for path 300 or from edge 1 to edge 12 for a path 400 of FIG. 4. The precomputation procedure is completed and the runtime step is performed. In step 210, the renderer 200 obtains the source and listener position data. In step 212, a direction path occlusion test between the source and the listener is performed. The procedure only continues if the result of the test in block 212 is that the direction path is occluded. If the direct path is not occluded, then a direct propagation occurs and any diffraction is not an issue for this path.

In step 214, the visible edge lists from a source on the one hand and the listener on the other hand are determined. This procedure corresponds to steps 102 and 104 and 106 of FIG. 6. In step 216, the paths are validated started from an input edge of the edge list and ending at an output edge of the edge list for the listener. This corresponds to the procedure performed in block 108 in FIG. 10. In step 218, the filter representation is determined so that a source location can be updated by rotation with respect to the associated edges and the diffraction filter, for example, from an UTD model database can be updated. Generally, however, the present invention is not limited to the UTD model database application, but the present invention can be applied using any specific calculation and application of filter information from a diffraction path. In step 220, the audio output signals for the audio scene are calculated, for example, by means of a binaural rendering using associated delay line modules that are there in order to render a distance effect in case the distance effect is not included within the corresponding binaural rendering directional filters such as certain HRTF filters.

Figure 12:
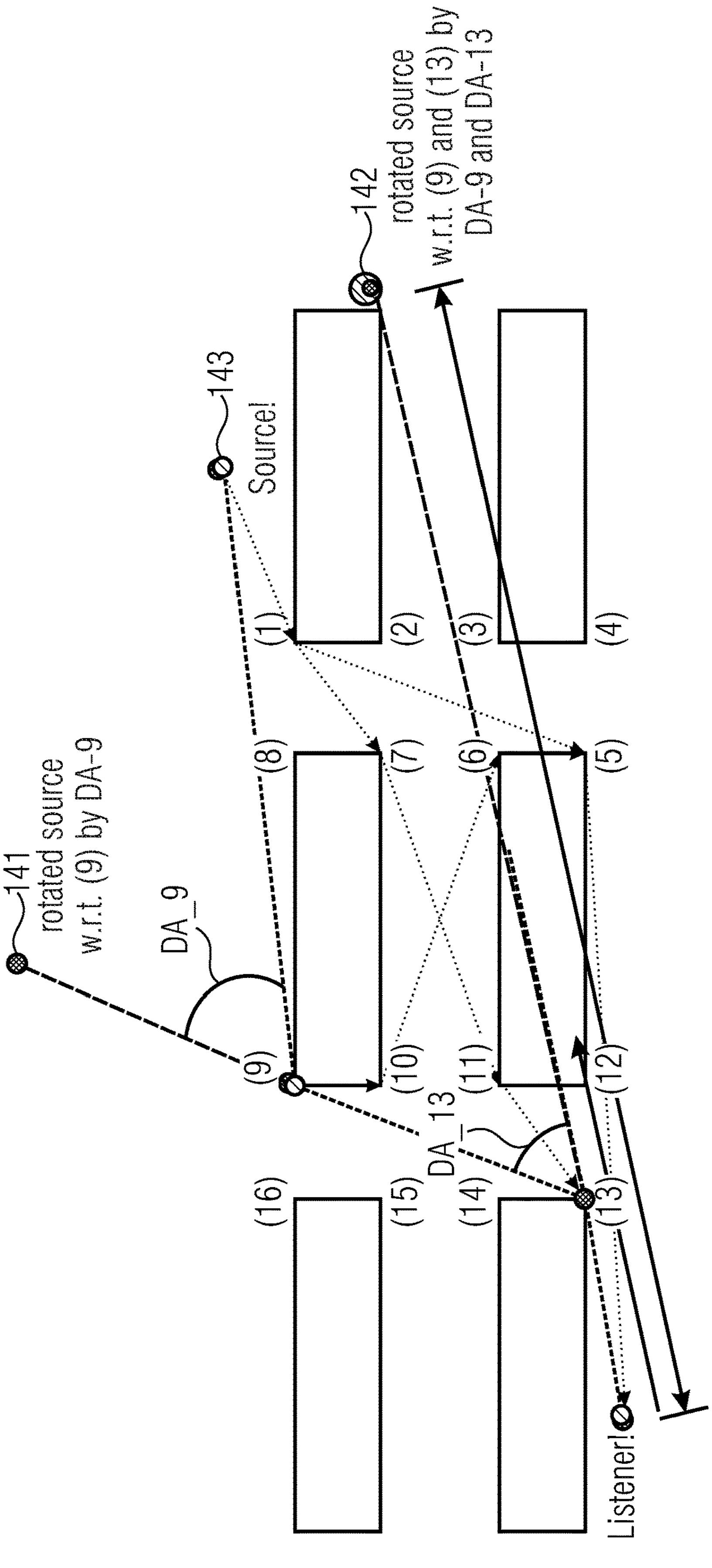
FIG. 12 illustrates the rotation performed to the unrotated or original source position for enhancing the audio quality of the rendered audio scene.

FIG. 12 illustrates the rotation performed to the unrotated source position for enhancing the audio quality of the rendered audio scene. This rotation is advantageously applied in the step 218 of FIG. 5 or in the step 218 in FIG. 6. The rotation of the source location for the purpose of rendering or spatialization is useful to enhance the spatial perception regarding the original source location. Therefore, regarding FIG. 12, the sound source is rendered at a new position 142 that is obtained by rotating from the original sound source position 143 to the intermediate position 141 around the edge 9 via angle DA_9. This angle is determined by the line connecting edges 13 and 9, so that a straight line is obtained. The intermediate position 141 is then rotated around edge 13 via angle DA_13 in order to have a straight line from the listener to the final rotated source position 142. Thus, not only the frequency dependent equalization or attenuation values are spatialized but also the perceived direction of the original source at the rotated source position 142. This final rotated source position is the perceived source position due to the sound diffraction effect changing the angle of the sound propagation at each diffraction process.

Reference is made to one exemplary diffraction path from the source to the listener "Source-(9)-(13)-Listener". The additional phi, theta information to reproduce spatial sound is generated using the positon of the rotated source 142.

Full associated filter information considering exact source/listener location already provides exact EQ information per frequency, i.e., the attenuation effect by the diffraction effect. Using the original source position and the distance to the original source already constitutes a low level implementation. This low level implementation is enhanced by additionally creating the information needed to select proper HRTF filters. To this end, the original sound source is rotated with respect to the relevant edges by the amount of the diffraction angles to generate the location of diffracted source. Then, the azimuth and elevation angles can be derived from this position relative to the listener and the total propagation distance along the path is obtainable.

FIG. 12 also illustrates the calculation of the distance between the finally rendered sound source position 142 and the listener position that is obtained by rotation process. It is advantageous to additionally use this distance for determining a delay of a distance-dependent attenuation of both for the rendering of the source.

Subsequently, further remarks regarding the usage and determination of the rotated position 143 of the original source position 143 is given. Every step for the calculations to obtain the valid path deals with the original source position 143. But, to achieve the binaural rendering for users who are equipped with headphones to feel a better immersive sound in VR space, the location of the sound source is advatangeously given to the binauralizer so that the binauralizer can apply the proper spatial filtering (H_L and H_R) to the original audio signal where H_L/H_R is called Head-related Transfer Function (HRTF) as for example described in https://www.ece.ucdavis.edu/cipic/spatial-sound/tutorial/hrtf/.

$$\text{Filterd\_}S\_L=H\_L(\text{phi},\text{theta},w)*S(w)$$

$$\text{Filterd\_}S\_R=H\_R(\text{phi},\text{theta},w)*S(w)$$

Mono signal S(w) does not have any localization cues to be used to generate spatial sound. But the filtered sound by HRTFs can reproduce a spatial impression. To do this, phi and theta (i.e., relative azimuth and elevation angle of the diffracted source) should be given through the process. This is the reason for rotating the original sound source. The renderer, therefore, receives information of the final source position 142 of FIG. 12 in addition to the filter information. Although it would be generally possible for a low level implementation to use the direction of the original sound source 143 so that the complexity for the sound source rotation can be avoided, this procedure suffers from a directional error visible in FIG. 12. For a low level implementation, however, this error is accepted. The same is true for the distance impression. As is shown in FIG. 12, the distance of the rotated source 142 to the listener is somewhat longer than the distance of the original source 143 to the listener. This error in distance can be accepted for a low level implantation for the sake of complexity reduction. For a high level application, however, this error can be avoided.

Thus, the generating the location of the diffracted sound source by rotating the original source with respect to relevant edges can also provide the propagation distance from the source and the listener where the distance is used for attenuation by distance.

This process to generate additional information for phi, theta and distance is also useful for multi-channel playback system. The only difference is that for the multi-channel playback system, a different set of spatial filters will be applied to S(w) to feed Filtered_S_i to the i-th speaker as "Filterd_S_i=H_i(phi, theta, w, other parameters)*S(w)".

Embodiments relate to an operation of the renderer that is configured to calculate, depending on the valid intermediate diffraction path or depending on the full diffraction path, a rotated audio source position being different from the audio source position due to a diffraction effect incurred by the valid intermediate diffraction path or depending on the full diffraction path, and to use the rotated position of the audio source in the calculating (220) the audio output signals for the audio scene, or that is configured to calculate the audio output signals for the audio scene using an edge sequence associated to the full diffraction path, and a diffraction angle sequence associated to the full diffraction path, in addition to the filter representation.

In another embodiment, the renderer is configured to determine a distance from the listener position to the rotated source position and to use the distance in the calculating the audio output signals for the audio scene.

In another embodiment, the renderer is configured to select one or more directional filters depending on the rotated source position and a predetermined output format for the audio output signals, and to apply the one or more directional filters and the filter representation to the audio signal in calculating the audio output signals.

In another embodiment, the renderer is configured to determine an attenuation value depending on a distance between the rotated source position and the listener position and to apply, in addition to the filter representation or one or more directional filters depending on the audio source position or the rotated audio source position to the audio signal.

In another embodiment, the renderer is configured to determine the rotated source position in a sequence of rotation operations comprising at least one rotation operation.

In a first step of the sequence, starting at a first diffraction edge of the full diffraction path, a path portion from the first diffraction edge to the source location is rotated in a first rotation operation to obtain a straight line from a second diffraction edge, or the listener position in case the full diffraction path only has the first diffraction edge, to a first intermediate rotated source position, wherein the first intermediate rotated source position is the rotated source position, when the full diffraction path only has the first diffraction edge. The sequence would be finished for a single diffraction edge. In a case with two diffraction edges, the first edge would be edge 9 in FIG. 12, and the first intermediate position is item 141.

In case of more than one diffraction edges, the result of the first rotation operation is rotated around the second diffraction edge in a second rotation operation to obtain a straight line from a third diffraction edge, or the listener position in case the full diffraction path only has the first and second diffraction edges, to a second intermediate rotated source position, wherein the second intermediate rotated source position is the rotated source position, when the full diffraction path only has the first and the second diffraction edges. The sequence would be finished for two diffraction edges. In a case with two diffraction edges, the first edge would be edge 9 in FIG. 12, and the second edge is edge 13.

In case of a path with more than two diffraction edges such as path 300 of FIG. 3, the procedure is continued wherein one or more rotation operations are additionally performed with the third diffraction edge 11 in FIG. 3 and then with edge 13 in FIG. 3 of with edge 12 in FIG. 3, and generally, until the full diffraction path is processed and a straight line from the listener position to the then obtained rotated source position is obtained.

Figure 2A:
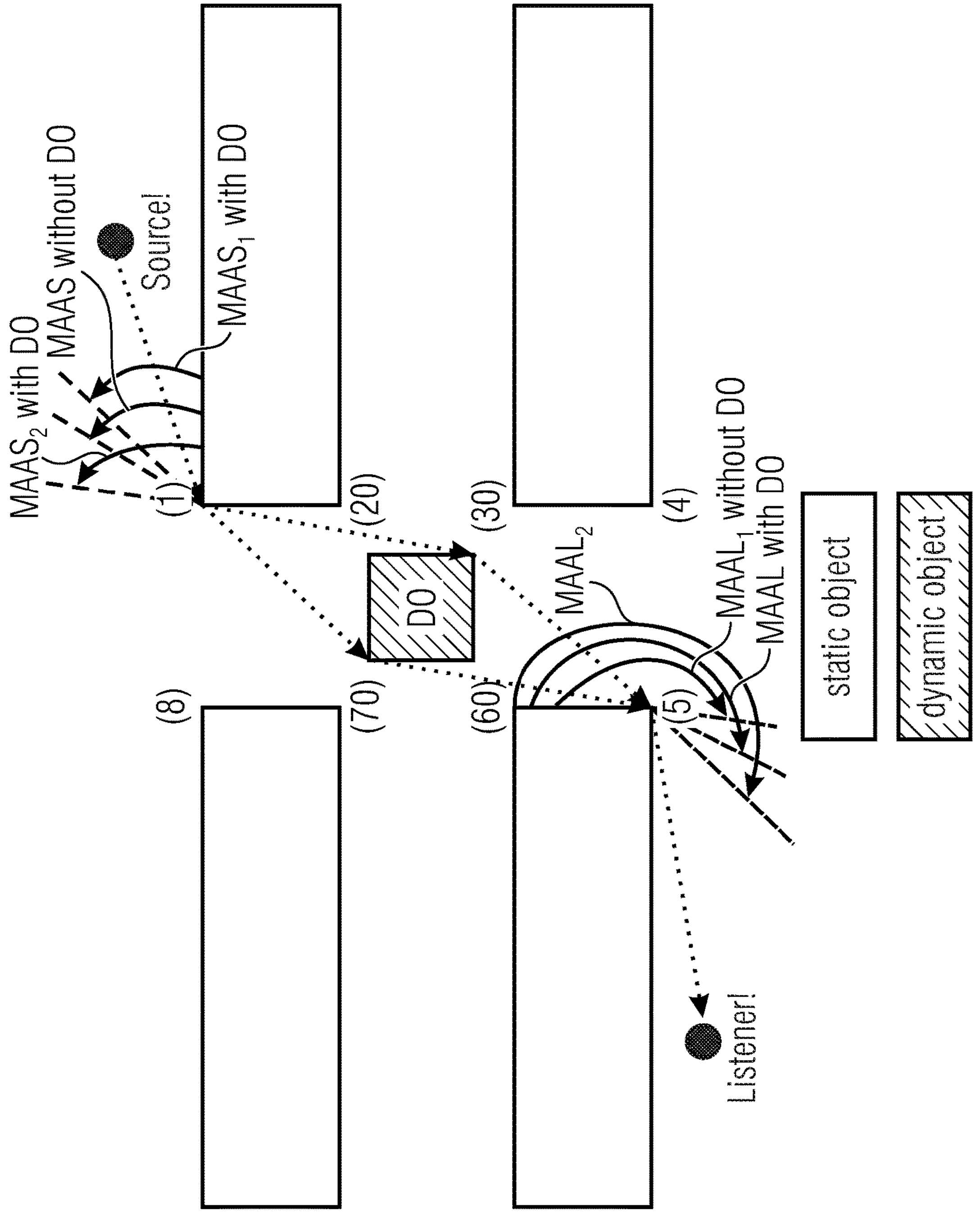
FIG. 2*a* is a top view of an example scene with four static objects and a single dynamic object.

Subsequently, an implementation for the handling of dynamic objects (DO) is illustrated. To this end, reference is made to FIG. 2*b* showing a dynamic object DO that has been placed, with respect to the situation in FIG. 1, in the central position of the audio scene from one instant to the other. This means that the intermediate diffraction path from edge 1 to edge 5 illustrated in FIG. 2*d* upper line is interrupted by means of the diffraction object DO and two new diffraction paths have been generated, one from edge 1 to edge 7 and then to edge 5 and the other one from edge 1 to edge 3 and then to edge 5. These diffraction paths are pertinent in case of a listener being placed to the left in FIG. 2*a*. Due to the fact that a dynamic object has been placed into the sound scene, also the MAAS and MAAL conditions have changed with respect to the situation without the dynamic object. The intermediate diffraction path list of FIG. 1 is augmented as is, for example, illustrated in item 226 of FIG. 6 by the two additional intermediate diffraction paths illustrated in the lower portion of FIG. 2*b*. Particularly, when it is assumed that the original path from the edge 1 to edge 5 in FIG. 5 is only a portion of a larger reflection situation where the source is not placed close to edge 1, but where there are, for example, one or more further reflection paths between objects and where the similar situation is with respect to the listener, then the pre-computed diffraction path existing for FIG. 1 without the dynamic object can easily be updated in runtime by only replacing the diffraction path from 1 to 5 in FIG. 1 by the two additional paths and by nevertheless leaving the earlier portion from edge 1 to any starting edge of the diffraction path as it is and by also leaving the path portion from edge 5 to any output edge or final edge as it is.

Figure 6:
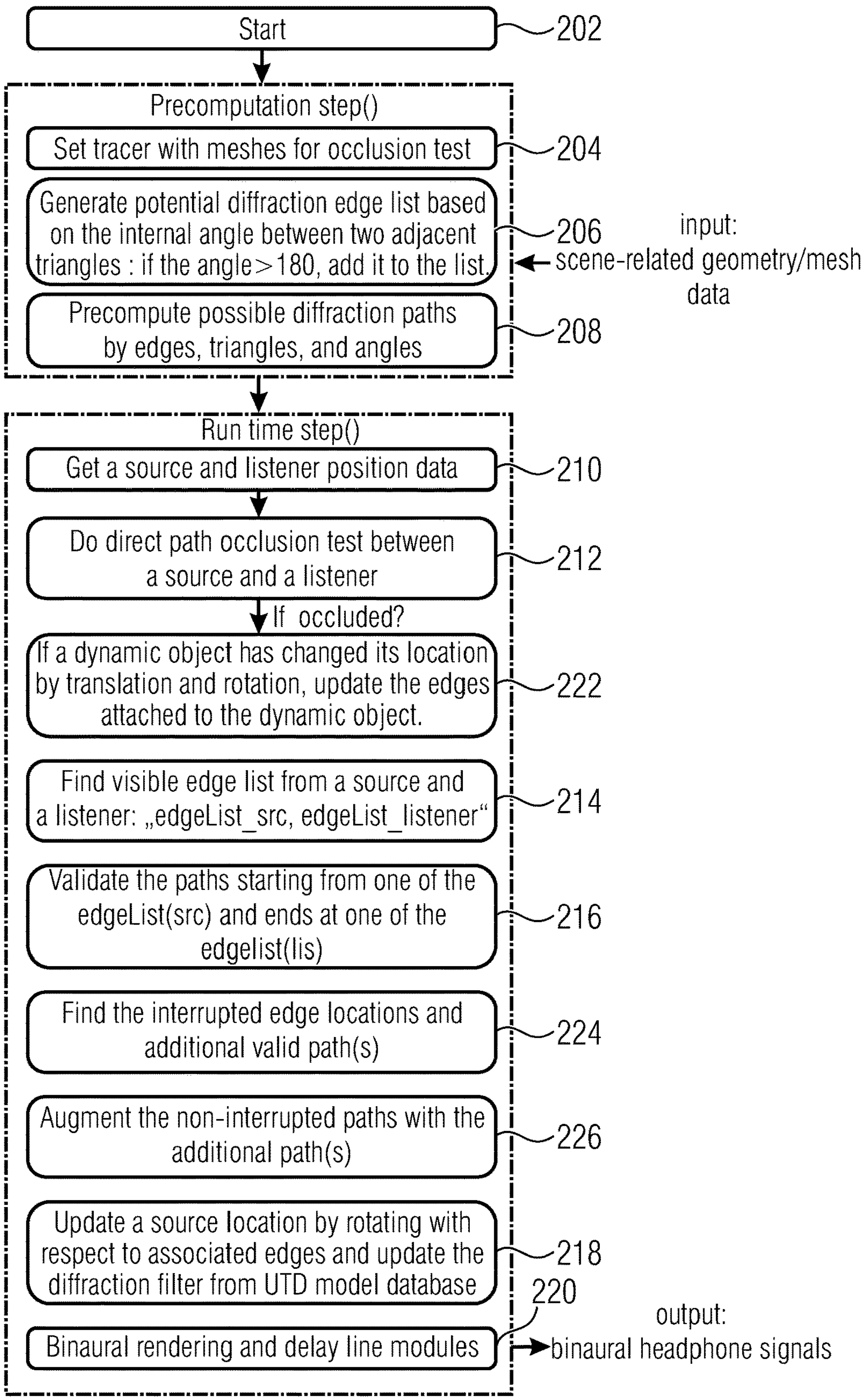
FIG. 6 illustrates a block diagram of an algorithm in accordance with a third embodiment to precompute the intermediate diffraction paths (including higher-order paths) and to render the diffracted sound considering dynamic objects in real-time.

FIG. 6 illustrates the situation of the procedure performed with dynamic objects. In step 222, it is determined whether a dynamic object DO has changed its location, for example, by translation and rotation. The edges attached to the dynamic object are updated. In the FIG. 2*a* example, the step 222 would determine that, in contrast to an earlier time instant illustrated at FIG. 1, a dynamic object is there with certain edges 70, 60, 20, 30. In step 214, the intermediate diffraction path comprising edges 1 and 5 would be found. In step 224, it would be determined that there is an interruption because of the dynamic object placed in the path between edges 1 and 5. In step 224, the additional paths as indicated in the lower portion of FIG. 2*b* from edge 1 over the dynamic object edge 30 to edge 5 on the one hand and from edge 1 over the dynamic object edge 60 to edge 5 would be found. In step 226, the non-interrupted path would be augmented by the two additional paths. This means that, from a path (not shown in the Figure) coming from any (non-illustrated) input edge to edge 1 and going from edge 5 to any (non-illustrated) output edge would be modified by replacing the path portion between edge 1 and edge 5 by the two other path portions indicated in FIG. 2*b*. The first path portion from an input edge to edge 1 would be stitched together with these two path portions to obtain two additional intermediate diffraction paths, and the output portion of the original path extending from edge 5 to an output edge would also be stitched to the two corresponding augmented intermediate diffraction paths so that, due to the dynamic object, from one earlier intermediate diffraction path (without the dynamic object), two new augmented earlier diffraction paths have been generated. The other steps illustrated in FIG. 6 take place similar to what has been illustrated in FIG. 5.

Rendering the diffraction effect by a dynamic object (in runtime) is one of the best ways to present interactive impression for entertainment with immersive media. The strategy to consider the diffraction by dynamic objects is as follows:

1) In the pre-computation step:
   A. If there is a dynamic object/geometry, then precompute the possible (intermediate) diffraction paths around a given dynamic object.
   B. If there are multiple dynamic objects/geometries, then precompute the possible (intermediate) diffraction paths around a single object based on the assumption that no diffraction is allowed between different dynamic objects.
   C. If there are a dynamic/geometry and a static object/geometry, then precompute the possible paths around a dynamic or static object based on the assumption that no diffraction is allowed between static and dynamic objects.
2) In runtime step:
   A. Only if a dynamic mesh is relocated (in terms of translation and rotation), update the potential edges which belong to a relocated dynamic mesh.
   B. Find the visible edge lists from a source and a listener.
   C. Validate the paths starting from the edge list of a source and ending at the edge list of a listener.
   D. Test the visibility between intermediate edge pairs and if there is an intrusion by an interrupting object that could be a dynamic object or a static object, then augment the path within the validated path by edges, triangles, and angles.

The extended algorithm to handle the dynamic object/geometry is shown in FIG. 6 with additional steps compared to the one for static scenes.

Considering that the method precomputes the (intermediate) diffraction path information, which does not need to be revisited except for the special case, a number of practical advantages arise compared to the State of the Art that in which it is not allowed to update precomputed data. Moreover, the flexible feature to combine multiple diffraction paths to generate an augmented one makes it possible to consider a static and dynamic object together.

(1) Lower computational complexity: the method does not require to build up a full path from a given source location to a listener's location in runtime. Instead, it only needs to find the valid intermediate path between two points.
(2) The ability to render diffraction effects of the combination of static and dynamic objects or multiple dynamic objects: State of the Art techniques need to update the whole visibility graph between (static or dynamic) edges in runtime to consider diffraction effects by static and dynamic objects at the same time. The method requires an efficient stitching process of two valid paths/path portions.

On the other hand, precomputing (intermediate) diffraction paths needs more time compared to the State of the Art techniques. However, it is possible to control the size of the precomputed path data by applying reasonable constraints such as the maximum allowed attenuation level in one full path, the maximum propagation distance, the maximum order for diffraction, and so on.

1) [Geometric Acoustics-based approach] The method was invented to apply the UTD model to multiple visible/properly oriented edges based on the precomputed (intermediate) path information. This precomputed data does not need to be monitored in real-time (most of time) except for the very rare cases such as the interruption by a dynamic object. Therefore, the invention minimizes the computation in real-time.
2) [Modularized] Each and every precomputed path works as a module.
   A. For static scenes, in a real-time step, we only need to find the valid modules between two spatial points.
   B. For dynamic scenes, even if there exists an interruption by a different object (A) within the valid path by an object (B), we need to augment the path via B with a valid path via A. (imagine stitching two different images)
3) [Supportive of fully dynamic interaction] Real-time rendering diffraction effects including the combination of static and dynamic objects or multiple dynamic objects is realizable.

It is to be mentioned here that all alternatives or aspects as discussed before and all aspects as defined by independent claims in the following claims can be used individually, i.e., without any other alternative or object than the contemplated alternative, object or independent claim. However, in other embodiments, two or more of the alternatives or the aspects or the independent claims can be combined with each other and, in other embodiments, all aspects, or alternatives and all independent claims can be combined to each other.

An inventively encoded signal can be stored on a digital storage medium or a non-transitory storage medium or can be transmitted on a transmission medium such as a wireless transmission medium or a wired transmission medium such as the Internet.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier or a non-transitory storage medium.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] L. Savioja and V. Välimäki. Interpolated rectangular 3-D digital waveguide mesh algorithms with frequency warping. *IEEE Trans. Speech Audio Process.,* 11(6) 783-790, 2003

[2] Mehra, R., Raghuvanshi, N., Antani, L., Chandak, A., Curtis, S., And Manocha, D. Wave-based sound propagation in large open scenes using an equivalent source formulation, *ACM Trans. on Graphics* 32(2) 19:1-19:13, 2013

[3] Mehra, R., Antani, L., Kim, S., and Manocha, D. Source and listener directivity for interactive wave-based sound propagation, *IEEE Transactions on Visualization and Computer Graphics,* 20(4) 495-503, 2014

[4] Nikunj Raghuvanshi and John M. Snyder, Parametric directional coding for precomputed sound propagation, *ACM Trans. on Graphics* 37(4) 108:1-108:14, 2018

[5] J. B. Allen, and D. A. Berkley, Image method for efficiently simulating small-room acoustics. *The Journal of the Acoustical Society of America* 65(4) 943-950, 1979

[6] M. Vorländer, Simulation of the transient and steady-state sound propagation in rooms using a new combined raytracing/image-source algorithm, *The Journal of the Acoustical Society of America* 86(1) 172-178, 1989

[7] T. Funkhouser, I. Carlbom, G. Elko, G. Pingali, M. Sondhi, and J. West, A beam tracing approach to acoustic modeling for interactive virtual environments, *In Proc. of ACM SIGGRAPH,* 21-32, 1998

[8] M. Taylor, A. Chandak, L. Antani, and D. Manocha, Resound: interactive sound rendering for dynamic virtual environments, In Proc. of the seventeen ACM international conference on Multimedia, 271-280, 2009

[9] R. G. Kouyoumjian and P. H. Pathak, A uniform geometrical theory of diffraction for an edge in a perfectly conducting surface, In Proc. of the IEEE 62, 11, 1448-1461, 1974

[10] U. P. Svensson, R. I. Fred, and J. Vanderkooy, An analytic secondary source model of edge diffraction impulse responses, Acoustical Society of America Journal 106 2331-2344, 1999

[11] N. Tsingos, T. Funkhouser, A. Ngan, and I. Carlbom, Modeling acoustics in virtual environments using the uniform theory of diffraction, In Proc. of the SIGGRAPH, 545-552, 2001

[12] M. Taylor, A. Chandak, Q. Mo, C. Lauterbach, C. Schissler, and D. Manocha, Guided multiview ray tracing for fast auralization. *IEEE Transactions on Visualization and Computer Graphics* 18, 1797-1810, 2012

[13] H. Yeh, R. Mehra, Z. Ren, L. Antani, D. Manocha, and M. Lin, Wave-ray coupling for interactive sound propagation in large complex scenes, *ACM Trans. Graph.* 32, 6, 165:1-165:11, 2013

The invention claimed is:

1. Apparatus for rendering an audio scene comprising an audio source at an audio source position and a plurality of diffracting objects, comprising:

a diffraction path provider for providing a plurality of intermediate diffraction paths through the plurality of diffracting objects, an intermediate diffraction path comprising a starting point and an output edge of the plurality of diffracting objects and an associated filter information for the intermediate diffraction path; and a renderer for rendering the audio source at a listener position, wherein the renderer is configured for determining, based on the output edges of the intermediate diffraction paths and the listener position, one or more valid intermediate diffraction paths from the audio source position to the listener position, determining, for each valid intermediate diffraction path of the one or more valid intermediate diffraction paths, a filter representation for a full diffraction path from the audio source position to the listener position corresponding to a valid intermediate diffraction path of the one or more valid intermediate diffraction paths using a combination of the associated filter information for the valid intermediate diffraction path and a filter information describing an audio signal propagation from the output edge of the valid intermediate diffraction path to the listener position, calculating audio output signals for the audio scene using an audio signal associated to the audio source and the filter representation for the full diffraction path, calculating, depending on the valid intermediate diffraction path or depending on the full diffraction path, a rotated audio source position being different from the audio source position due to a diffraction effect incurred by the valid intermediate diffraction path or depending on the full diffraction path, and for using the rotated position of the audio source in the calculating the audio output signals for the audio scene, or calculating the audio output signals for the audio scene using an edge sequence associated to the full diffraction path, and a diffraction angle sequence associated to the full diffraction path, in addition to the filter representation, and determining the rotated audio source position in a sequence of rotation operations comprising at least one rotation operation, wherein starting at a first diffraction edge of the full diffraction path, a path portion from the first diffraction edge to the audio source position is rotated in a first rotation operation to acquire a straight line from a second diffraction edge or the listener position in case the full diffraction path only comprises the first diffraction edge to a first intermediate rotated audio source position, wherein the first intermediate rotated audio source position is the rotated audio source position, when the full diffraction path only comprises the first diffraction edge, or wherein a result of the first rotation operation is rotated around the second diffraction edge in a second rotation operation to acquire a straight line from a third diffraction edge or the listener position in case the full diffraction path only comprises the first and second diffraction edges to a second intermediate rotated audio source position, wherein the second intermediate rotated audio source position is the rotated audio source position, when the full diffraction path only comprises the first and the second diffraction edges, and wherein one or more rotation operations are performed until the full diffraction path is processed and a straight line from the listener position to a final rotated audio source position is acquired, wherein the final rotated audio source position is reached subsequent to the one or more rotation operations.

2. Apparatus of claim 1, wherein the audio source position is fixed and the diffraction path provider is implemented as a preprocessor and is configured to determine each valid intermediate diffraction path so that the starting point of each valid intermediate diffraction path corresponds to the audio source position, or wherein the audio source position is variable, and wherein the diffraction path provider is implemented as a preprocessor and is configured to determine, as the starting point of an intermediate diffraction path, an input edge of the plurality of diffracting objects, and wherein the renderer is configured to determine, additionally based on the input edge(s) of the one or more intermediate diffraction paths and the audio source position, the one or more valid intermediate diffraction paths, and to determine the filter representation for the full diffraction path additionally based a further filter information describing an audio signal propagation from the audio source position to the input edge of the valid intermediate diffraction path associated with the full diffraction path.

3. Apparatus of claim 1, wherein the renderer is configured to perform an occlusion test for a direct path from the audio source position to the listener position and to only determine the one or more valid intermediate diffraction paths, when the occlusion test indicates that the direct path is occluded.

4. Apparatus of claim 2, wherein the renderer is configured to determine the filter representation for the full diffraction path by multiplying a frequency domain representation of the associated filter information and a frequency domain representation of the filter information for the audio signal propagation from the output edge of the valid intermediate diffraction path to the listener position or a frequency domain representation of a further filter information describing an audio signal propagation from the audio source position to the input edge of the valid intermediate diffraction path.

5. Apparatus of claim 1, wherein the renderer is configured to determine a starting group of potential input edges depending on the audio source position or to determine a final group of potential output edges depending on the listener position, to retrieve one or more potential valid intermediate diffraction paths from a pre-stored list of intermediate diffraction paths using the starting group or the final group, and to validate the one or more potential valid intermediate diffraction paths using a source angle criterion and a source angle between the audio source position and the corresponding input edge or using a final angle criterion and a listener angle between the listener position and a corresponding output edge.

6. Apparatus of claim 5, wherein the renderer is configured to calculate the source angle and to compare the source angle to a maximum allowable angle for the source as the source angle criterion and to validate a potential intermediate diffraction path to become the valid intermediate diffraction path when the source angle is lower than the maximum allowable angle for the audio source, or wherein the renderer is configured to calculate the listener angle and to compare the listener angle to a minimum allowable angle for a listener as the listener angle criterion and to validate a potential intermediate diffraction path to become the valid intermediate diffraction path, when the listener angle is greater than the minimum allowable angle for the listener.

7. Apparatus of claim 1, wherein the diffraction path provider is configured to access a memory having a pre-stored list comprising entries for the plurality of intermediate diffraction paths, wherein each intermediate diffraction path entry comprises a sequence of edges, the sequence of edges extending from an input edge to an output edge, or wherein each intermediate diffraction path entry comprises a sequence of triangles, the sequence of triangles extending from an input triangle to an output triangle, or wherein each intermediate diffraction path entry comprises a sequence of items, the sequence of items starting from a source angle criterion, comprising one or more intermediate angles and comprising a listener angle criterion.

8. Apparatus of claim 7, wherein the intermediate diffraction path list entry of the pre-stored list comprises the associated filter information or a reference to the associated filter information, or wherein the renderer is configured to derive the associated filter information from data in the intermediate diffraction path entry of the pre-stored list.

9. Apparatus of claim 1, wherein the plurality of diffracting objects of the audio scene comprises a dynamic object, and wherein the diffraction path provider is configured to provide at least one intermediate diffraction path around the dynamic object.

10. Apparatus of claim 1, wherein the plurality of diffracting objects of the audio scene comprises two or more dynamic diffracting objects, and wherein the diffraction path provider is configured to provide intermediate diffraction paths around a single dynamic diffracting object based on an assumption that a diffraction is not allowed between two different dynamic objects.

11. Apparatus of claim 1, wherein the plurality of diffracting objects of the audio scene comprises one or more dynamic objects and one or more static objects, and wherein the diffraction path provider is configured to provide intermediate diffraction paths around a dynamic object or a static object based on an assumption that a diffraction is not allowed between a static object and a dynamic object.

12. Apparatus of claim 1, wherein the plurality of diffracting objects comprises at least one dynamic diffracting object, wherein the renderer is configured to determine whether the at least one dynamic diffracting object has been relocated by a relocation with respect to at least of a translation and a rotation, the at least one dynamic diffracting object representing a relocated dynamic object, to update edges attached to the relocated dynamic object;

to examine, in the determining the one or more valid intermediate diffraction paths, a potential valid intermediate diffraction path regarding a visibility between internal edge pairs, wherein in case of an interruption of the visibility between the internal edge pairs due to the relocation of the relocated dynamic object, the potential valid intermediate diffraction path is augmented by an additional path incurred due to the relocated dynamic object to obtain the valid intermediate diffraction path.

13. Apparatus of claim 1, wherein the renderer is configured to apply the uniform theory of diffraction to determine the associated filter information, or wherein the renderer is configured to determine the associated filter information in a frequency-dependent manner.

14. Apparatus of claim 1, wherein the renderer is configured to determine a distance from the listener position to the rotated audio source position and to use the distance in the calculating the audio output signals for the audio scene.

15. Apparatus of claim 1, wherein the renderer is configured to select one or more directional filters depending on the rotated audio source position and a predetermined output format for the audio output signals, and to apply the one or more directional filters and the filter representation to the audio signal in calculating the audio output signals.

16. Apparatus of claim 1, wherein the renderer is configured to determine an attenuation value depending on a distance between the rotated audio source position and the listener position and to apply, in addition to the filter representation or one or more directional filters depending on the audio source position or the rotated audio source position to the audio signal.

17. Method for rendering an audio scene comprising an audio source at an audio source position and a plurality of diffracting objects, comprising: providing a plurality of intermediate diffraction paths through the plurality of diffracting objects, an intermediate diffraction path comprising a starting point and an output edge of the plurality of diffracting objects and an associated filter information for the intermediate diffraction path; and rendering the audio source at a listener position, wherein the rendering comprises determining, based on the output edges of the intermediate diffraction paths and the listener position, one or more valid intermediate diffraction paths from the audio source position to the listener position, determining, for each valid intermediate diffraction path of the one or more valid intermediate diffraction paths, a filter representation for a full diffraction path from the audio source position to the listener position corresponding to a valid intermediate diffraction path of the one or more valid intermediate diffraction paths using a combination of the associated filter information for the valid intermediate diffraction path and a filter information describing an audio signal propagation from the output edge of the valid intermediate diffraction path to the listener position, calculating audio output signals for the audio scene using an audio signal associated to the audio source and the filter representation for the full diffraction path; calculating, depending on the valid intermediate diffraction path or depending on the full diffraction path, a rotated audio source position being different from the audio source position due to a diffraction effect incurred by the valid intermediate diffraction path or depending on the full diffraction path, and for using the rotated position of the audio source in the calculating the audio output signals for the audio scene, or calculating the audio output signals for the audio scene using an edge sequence associated to the full diffraction path, and a diffraction angle sequence associated to the full diffraction path, in addition to the filter representation, and determining the rotated audio source position in a sequence of rotation operations comprising at least one rotation operation, wherein starting at a first diffraction edge of the full diffraction path, a path portion from the first diffraction edge to the audio source position is rotated in a first rotation operation to acquire a straight line from a second diffraction edge or the listener position in case the full diffraction path only comprises the first diffraction edge to a first intermediate rotated audio source position, wherein the first intermediate rotated audio source position is the rotated audio source position, when the full diffraction path only comprises the first diffraction edge, or wherein a result of the first rotation operation is rotated around the second diffraction edge in a second rotation operation to acquire a straight line from a third diffraction edge or the listener position in case the full diffraction path only comprises the first and second diffraction edges to a second intermediate rotated audio source position, wherein the second intermediate rotated audio source position is the rotated audio source position, when the full diffraction path only comprises the first and the second diffraction edges, and wherein one or more rotation operations are performed until the full diffraction path is processed and a straight line from the listener position to a final rotated audio source position is acquired, wherein the final rotated audio source position is reached subsequent to the one or more rotation operations.

18. A non-transitory digital storage medium having a computer program stored thereon to perform, when said computer program is run by a computer, a method for rendering an audio scene comprising an audio source at an audio source position and a plurality of diffracting objects, the method comprising:

providing a plurality of intermediate diffraction paths through the plurality of diffracting objects, an intermediate diffraction path comprising a starting point and an output edge of the plurality of diffracting objects and an associated filter information for the intermediate diffraction path; and rendering the audio source at a listener position, wherein the rendering comprises determining, based on the output edges of the intermediate diffraction paths and the listener position, one or more valid intermediate diffraction paths from the audio source position to the listener position, determining, for each valid intermediate diffraction path of the one or more valid intermediate diffraction paths, a filter representation for a full diffraction path from the audio source position to the listener position corresponding to a valid intermediate diffraction path of the one or more valid intermediate diffraction paths using a combination of the associated filter information for the valid intermediate diffraction path and a filter information describing an audio signal propagation from the output edge of the valid intermediate diffraction path to the listener position, calculating audio output signals for the audio scene using an audio signal associated to the audio source and the filter representation for the full diffraction path, calculating, depending on the valid intermediate diffraction path or depending on the full diffraction path, a rotated audio source position being different from the audio source position due to a diffraction effect incurred by the valid intermediate diffraction path or depending on the full diffraction path, and for using the rotated position of the audio source in the calculating the audio output signals for the audio scene, or calculating the audio output signals for the audio scene using an edge sequence associated to the full diffraction path, and a diffraction angle sequence associated to the full diffraction path, in addition to the filter representation, and determining the rotated audio source position in a sequence of rotation operations comprising at least one rotation operation, wherein starting at a first diffraction edge of the full diffraction path, a path portion from the first diffraction edge to the audio source position is rotated in a first rotation operation to acquire a straight line from a second diffraction edge or the listener position in case the full diffraction path only comprises the first diffraction edge to a first intermediate rotated audio source position, wherein the first intermediate rotated audio source position is the rotated audio source position, when the full diffraction path only comprises the first diffraction edge, or wherein a result of the first rotation operation is rotated around the second diffraction edge in a second rotation operation to acquire a straight line from a third diffraction edge or the listener position in case the full diffraction path only comprises the first and second diffraction edges to a second intermediate rotated audio source position, wherein the second intermediate rotated audio source position is the rotated audio source position, when the full diffraction path only comprises the first and the second diffraction edges, and wherein one or more rotation operations are performed until the full diffraction path is processed and a straight line from the listener position to a final rotated audio source position is acquired, wherein the final rotated audio source position is reached subsequent to the one or more rotation operations.

* * * * *